(12) United States Patent
Sakaguchi

(10) Patent No.: US 7,206,103 B2
(45) Date of Patent: Apr. 17, 2007

(54) IMAGE READING APPARATUS AND IMAGE READING METHOD

(75) Inventor: Yasunobu Sakaguchi, Kanagawa (JP)

(73) Assignee: FujiFilm Corporation, Tokyo (JP)

( * ) Notice: Subject to any disclaimer, the term of this patent is extended or adjusted under 35 U.S.C. 154(b) by 589 days.

(21) Appl. No.: 10/693,934

(22) Filed: Oct. 28, 2003

(65) Prior Publication Data

US 2004/0085595 A1    May 6, 2004

Related U.S. Application Data

(63) Continuation of application No. 09/343,506, filed on Jun. 30, 1999, now abandoned.

(30) Foreign Application Priority Data

Jun. 30, 1998    (JP)    ................................. 10-185264

(51) Int. Cl.
     *H04N 1/04*      (2006.01)
(52) U.S. Cl. ...................... 358/474; 358/487; 358/475; 358/498; 358/497; 358/496
(58) Field of Classification Search ................ 358/474, 358/487, 475, 483, 498, 489, 509, 497, 496; 382/235
See application file for complete search history.

(56) References Cited

U.S. PATENT DOCUMENTS 5,745,254 A * 4/1998 Satou ......................... 358/412
5,917,578 A * 6/1999 Nakamura ................... 355/40
5,933,214 A    8/1999 Satoh et al.
5,991,010 A    11/1999 Nishio
6,381,001 B1    4/2002 Katakura et al.
6,519,046 B1    2/2003 Kinjo
6,614,564 B1 * 9/2003 Sakaguchi ................... 358/487
6,816,287 B1 * 11/2004 Sakaguchi ................... 358/474
6,819,799 B1 * 11/2004 Sakaguchi ................... 382/235

* cited by examiner

*Primary Examiner*—Douglas Q. Tran
*Assistant Examiner*—Negussie Worku
(74) *Attorney, Agent, or Firm*—Sughrue Mion, PLLC

(57) ABSTRACT

After prescan of a plurality of images on a photographic film, designation of an image to be processed and verification of the image to be processed, the photographic film is conveyed at high speed to a position where the reading conditions for the image to be processed can be set. When reading the image to be processed, the photographic film is conveyed at the same conveying speed as at the time of fine scan, and from the time point when the reading is complete, the high speed conveying of the photographic film is resumed and the photographic film is delivered. In a case where adjacent images are designated as the images to be processed, an operation similar to the one described above is performed until completion of reading the images to be processed, and then, the images to be processed are fine scanned after returning the photographic film to a position where the reading conditions for the images to be processed can be set.

19 Claims, 27 Drawing Sheets

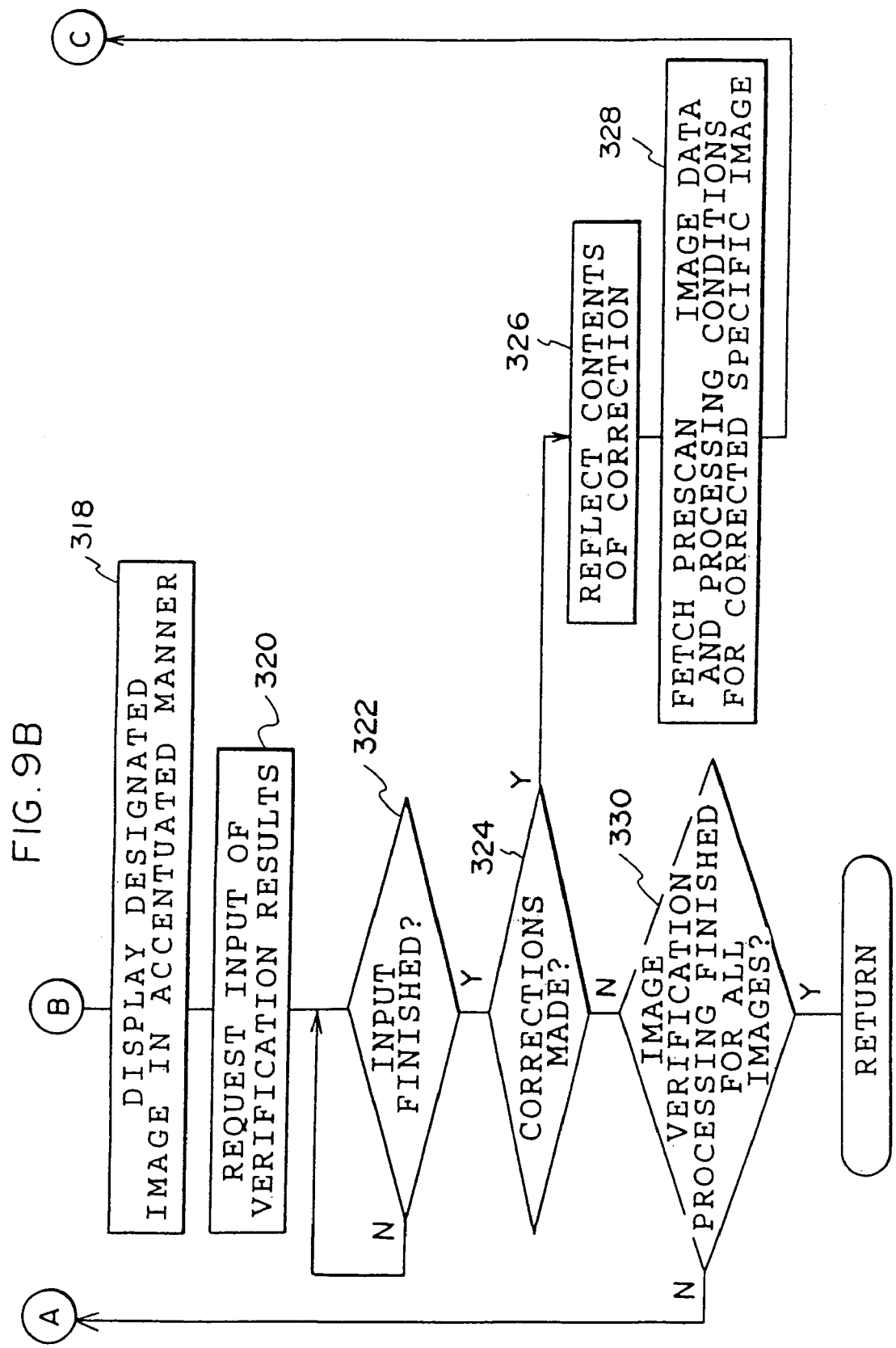

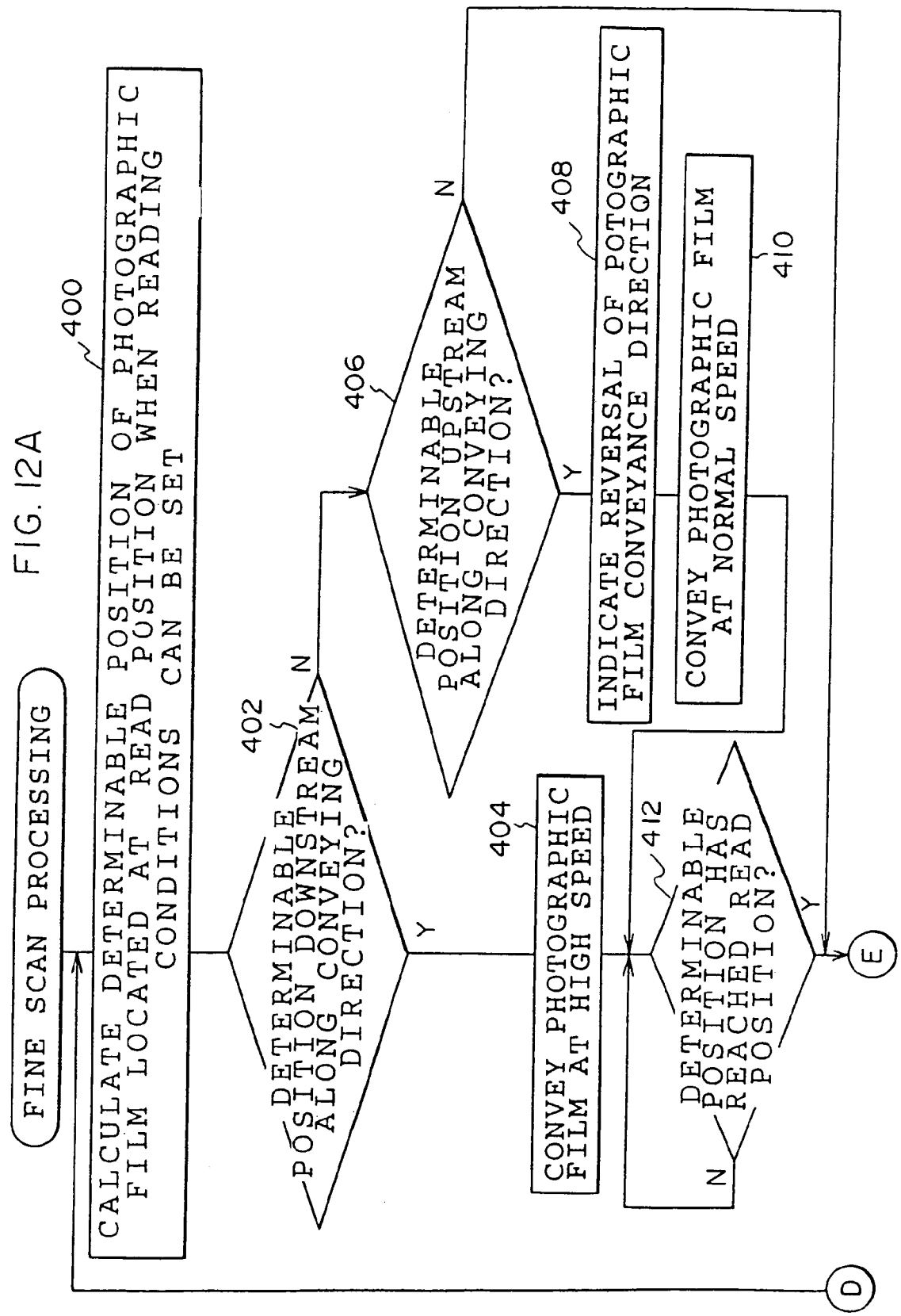

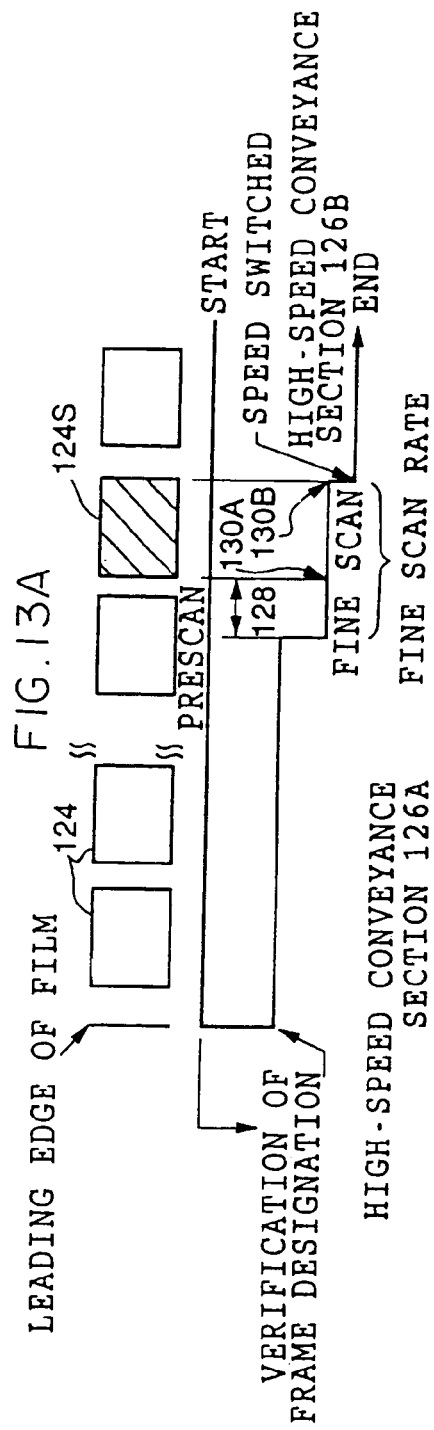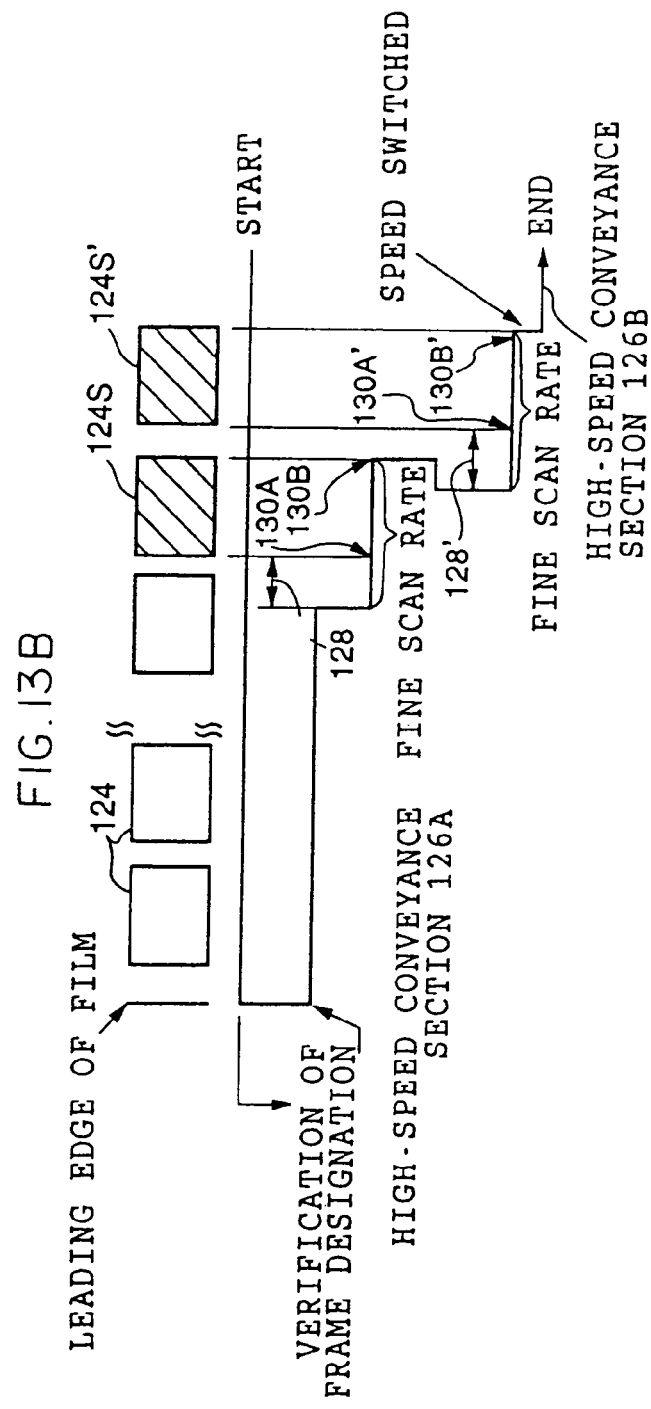

IMAGE READING APPARATUS AND IMAGE READING METHOD

This is a continuation of application Ser. No. 09/343,506 filed Jun. 30, 1999 now abandoned; the disclosure of which is incorporated herein by reference.

BACKGROUND OF THE PRESENT INVENTION

1. Field of the Present Invention

The present invention relates to an image reading apparatus and an image reading method, and more particularly, to an image reading apparatus and an image reading method for reading each image of an original to be read which has a plurality of images recorded thereon, such as a photographic film.

2. Description of the Related Art

In recent years, a photographic processing method has been proposed, in which a film image recorded on a photographic film is read by being separated into the component colors of R, G, B and the image data thus obtained is recorded in a recording medium or displayed on a display unit after image processing such as corrections of various types. The photographic film referred to herein is a film that is developing processed after a subject is photographed, to make visible a negative or positive image.

In an image reading apparatus used for reading the film image in this type of photographic processing method, a preparatory reading operation (hereinafter referred to as prescan) is performed for reading the image with comparative rapidity and low accuracy for the purpose of increasing the image reading speed, and based on the image data obtained by the prescan, the main reading operation (hereinafter referred to as fine scan) is performed for reading the image at a comparatively slow speed with high accuracy. For performing these reading operations, reading conditions for carrying out fine scan and processing conditions for image processing of various types on the image data obtained by the fine scan are determined, and the fine scan is carried out under the reading conditions thus determined. Then the image data obtained by the fine scan are processed under the processing conditions determined above.

In a technique capable of realizing this image reading apparatus disclosed in Japanese Patent Application Laid-Open (JP-A) No. 9-298657, a color image recorded on a photographic film or the like is optically read to produce image data, and based on this image data, the color image is displayed on display means such as a CRT. The operator observes each color image, and in accordance with the desires of the customer, sets image processing conditions in such a manner that color images having a uniform general hue, tone, density, etc. are realized from a plurality of color images. The color images thus are reproduced according to the contents of the conditions thus set.

However, the technique disclosed in JP-A No. 9-298657 described above in which a plurality of images are recorded on an original to be read, and a technique for reading a plurality of such images described thereafter in JP-A No. 9-298657 lack the means for designating a part of a plurality of the images and covers all the images as the object of reading. In the case where the reading of a specific image alone is desired, therefore, all the images must be read, resulting in the problem of a longer overall processing time.

SUMMARY OF THE PRESENT INVENTION

The present invention has been developed for obviating the problems described above and the object thereof is to provide an image reading apparatus and an image reading method capable of reducing overall processing time.

In order to achieve the aforementioned object, according to a first aspect of the present invention, there is provided an image reading apparatus comprising a light source for illuminating an original to be read with a plurality of images recorded thereon; conveying means for conveying the original to be read in such a manner that the plurality of images sequentially come to be located at a predetermined reading position; an image sensor for separating each image recorded on the original to be read into a plurality of pixels, reading the pixels and outputting image data; designating means for designating an image to be read among the plurality of images; and control means for controlling the conveying means in such a manner that the original to be read is conveyed at a speed greater than or equal to a conveying speed corresponding to a reading speed of the image to be read until a reading start position for the image to be read designated by the designating means or a vicinity thereof comes to be located at the predetermined reading position, and when reading the image to be read, the original to be read is conveyed at a conveying speed corresponding to the reading speed for the image to be read.

With the image reading apparatus according to the first aspect of the present invention, an original to be read having a plurality of images recorded thereon is irradiated by a light source, and the original to be read is conveyed by the conveying means in such a manner that a plurality of the images are located sequentially at a predetermined reading position, and each image recorded in the original to be read is read by being separated into a plurality of pixels by an image sensor and output as an image data. The original to be read may be a transparent original such as a photographic film or a reflective original such as a photographic print. Also, the image sensor may be a line CCD, an area CCD or a photoelectric conversion element other than a CCD.

Also, with the image reading apparatus according to the first aspect of the present invention, an image to be read among a plurality of images recorded on an original to be read is designated by the designating means, and the conveying means is controlled by the control means in such a manner that the original to be read is conveyed at a speed greater than or equal to a conveying speed corresponding to a reading speed of the image to be read until the reading start position of the designated image to be read or a vicinity thereof comes to be located at a predetermined reading position, and when reading the image to be read, the original to be read is conveyed at a conveying speed corresponding to the reading speed of the image to be read.

The following are examples of the designation by the designating means of the image to be read. When the image reading apparatus of the present invention is provided with an inputting means such as a keyboard for inputting respective types of information, an operator, via the inputting means, may designate in advance the image to be read. When the image reading apparatus of the present invention is provided with a storage means such as a hard disk or with a reading means for reading a recording medium such as a memory card or a floppy disk, information expressing the image to be read may be stored in advance in the storage means or the recording medium, and the designation can be carried out by inputting this information. Further, when the original to be read is a photographic photosensitive material having a magnetic layer (i.e., a so-called APS film), information expressing the image to be read can be stored in advance in the magnetic layer, and the designation can be carried out by inputting this information. If the original to be read is such that a bar code can be applied thereto, the information expressing the image to be read can be applied in advance as a barcode, and the designation can be carried out by inputting this information.

In this way, in the image reading apparatus according to the first aspect of the present invention, the original to be read is conveyed at a speed greater than or equal to a conveying speed corresponding to a reading speed of the image to be read, until the reading start position of the image to be read or a vicinity thereof comes to be located at a predetermined reading position. Therefore, the overall processing time can be shortened.

According to the second aspect of the present invention, there is provided an image reading apparatus characterized in that in the image reading apparatus according to the first aspect of the present invention, in the case where a plurality of images to be read are designated by the designating means and these images are read successively, the control means controls the conveying means in such a way that in the case where the conditions for reading the second image of two adjacent images to be read cannot be set until the second image starts to be read, the original to be read is returned to a position where the conditions for reading the second image can be set.

The image reading apparatus according to the second aspect of the present invention is characterized in that in the image reading apparatus according to the first aspect of the present invention, in the case where a plurality of images to be read are designated by the designating means and these images are read successively, the control means controls the conveying means in such a way that in the case where the conditions for reading the second image of two adjacent images to be read cannot be set until the second image starts to be read, the original to be read is returned to a position where the conditions for reading the second image can be set.

As described above, the image reading apparatus according to the second aspect of the present invention can produce an effect similar to that of the first aspect of the present invention. At the same time, in the case where the conditions for reading the second image of two adjacent images cannot be set until the second image starts to be read, the position of the original to be read is returned to a position where the reading conditions for the second image can be set. Therefore, the reading conditions can be positively set for each image to be read.

According to a third aspect of the present invention, there is provided an image reading apparatus characterized in that in the image reading apparatus according to the second aspect of the present invention, the reading conditions include the conveying speed of the conveying means to convey the original to be read.

In setting the conveying of the original to be read by the conveying means to a predetermined conveying speed, there exists a period before reaching the predetermined conveying speed from the present conveying speed. The fact that this period cannot be provided before the second image to be read starts to be read is equivalent to the fact that the reading conditions cannot be set in the second aspect of the present invention.

As described above, in the image reading apparatus according to the third aspect of the present invention, the reading conditions in the second aspect of the present invention include the speed of the conveying means to convey the original to be read, and therefore the conveying speed of the original to be read can be reliably set to a value corresponding to the desired reading speed, and highly-accurate reading is made possible.

In an image reading apparatus according to a fourth aspect of the present invention, in the image reading apparatus of the first aspect, on the basis of the reading start position for the image to be read, the control means determines whether or not the original to be read should be conveyed at a speed greater than or equal to a conveying speed corresponding to the reading speed of the image to be read until the reading start position for the image to be read or a vicinity thereof comes to be located at the predetermined reading position, and only in a case in which it is determined that the original to be read should be conveyed at a speed greater than or equal to a conveying speed corresponding to the reading speed, the control means controls the conveying means to convey the original to be read at a speed greater than or equal to a conveying speed corresponding to the reading speed of the image to be read until the reading start position for the image to be read or a vicinity thereof comes to be located at the predetermined reading position.

In accordance with the image reading apparatus of the fourth aspect, on the basis of the reading start position for the image to be read, the control means of the image reading apparatus of the first aspect determines whether or not the original to be read should be conveyed at a speed greater than or equal to a conveying speed corresponding to the reading speed of the image to be read, until the reading start position for the image to be read or a vicinity thereof comes to be located at the predetermined reading position. Only in a case in which it is determined that the original to be read should be conveyed at a speed greater than or equal to a conveying speed corresponding to the reading speed, the conveying means is controlled to convey the original to be read at a speed greater than or equal to a conveying speed corresponding to the reading speed of the image to be read, until the reading start position for the image to be read or a vicinity thereof comes to be located at the predetermined reading position.

The determination as to whether or not the original to be read should be conveyed at a speed greater than or equal to a conveying speed corresponding to the reading speed of the image to be read, is affirmative in cases such as the following: a case in which the reading start position of the next image to be read is separated from the current reading position to the extent that sufficient time is ensured to carry out respective settings for reading this image to be read; a case in which plural images or the same one image is read repeatedly plural times under different reading conditions from the same reading start position; a case in which, when the original to be read is a photographic photosensitive material having a magnetic layer (a so-called APS film), the reading start position of the next image to be read is located at a position at which can be ensured a stable conveying speed required for the recording of information onto the magnetic layer or the reading of information from the magnetic layer; and the like.

In this way, in accordance with the image reading apparatus of the fourth aspect, on the basis of the reading start position for the image to be read, a determination is made as to whether or not the original to be read should be conveyed at a speed greater than or equal to a conveying speed corresponding to the reading speed of the image to be read, until the reading start position for the image to be read or a vicinity thereof comes to be located at the predetermined reading position. Only in a case in which it is determined that the original to be read should be conveyed at a speed greater than or equal to a conveying speed corresponding to the reading speed, the original to be read is conveyed at a speed greater than or equal to a conveying speed corresponding to the reading speed of the image to be read, until the reading start position for the image to be read or a vicinity thereof comes to be located at the predetermined reading position. Thus, the overall processing time can reliably be shortened.

A fifth aspect of the present invention is an image reading method in which an original to be read, on which a plurality of images are recorded, is illuminated with light, the original to be read is conveyed such that the plurality of images are successively positioned at a predetermined reading position, each of the plurality of images is separated into plural pixels and read by an image sensor, and is outputted as image data, said image reading method comprising the steps of:

conveying the original to be read at a speed greater than a conveying speed corresponding to a reading speed of an image to be read, which is designated from among the plurality of images recorded on the original to be read, until a reading start position of the image to be read or a vicinity thereof comes to be located at the predetermined reading position; and effecting control such that, at the time of reading the image to be read, the original to be read is conveyed at a conveying speed corresponding to a reading speed of the image to be read.

In accordance with the image reading method of the fifth aspect of the present invention, in the same way as in the image reading apparatus of claim 1, the original to be read is conveyed at a speed greater than a conveying speed corresponding to the reading speed of the image to be read, until the reading start position for the image to be read or a vicinity thereof comes to be located at the predetermined reading position. Thus, the overall processing time can reliably be shortened.

BRIEF DESCRIPTION OF THE DRAWINGS

FIGS. 9A and 9B are flowcharts for the image verification processing executed during the execution of the image reading processing in FIG. 8.

FIGS. 12A and 12B are flowcharts for the fine scan processing executed during the execution of the image reading processing in FIG. 8.

FIG. 13A is a schematic diagram showing relative positions of the line CCD and the photographic film during the image reading processing in the case where there is only one image to be processed.

FIG. 13B is a diagram showing relative positions of the line CCD and the photographic film during the image reading processing in the case where images to be processed are adjacent to each other and the conditions for the second image to be read ordinarily cannot be set in time.

DESCRIPTION OF THE PREFERRED EMBODIMENT

First Embodiment

A first embodiment of the present invention will be explained in detail below with reference to the drawings.

Figure 1:
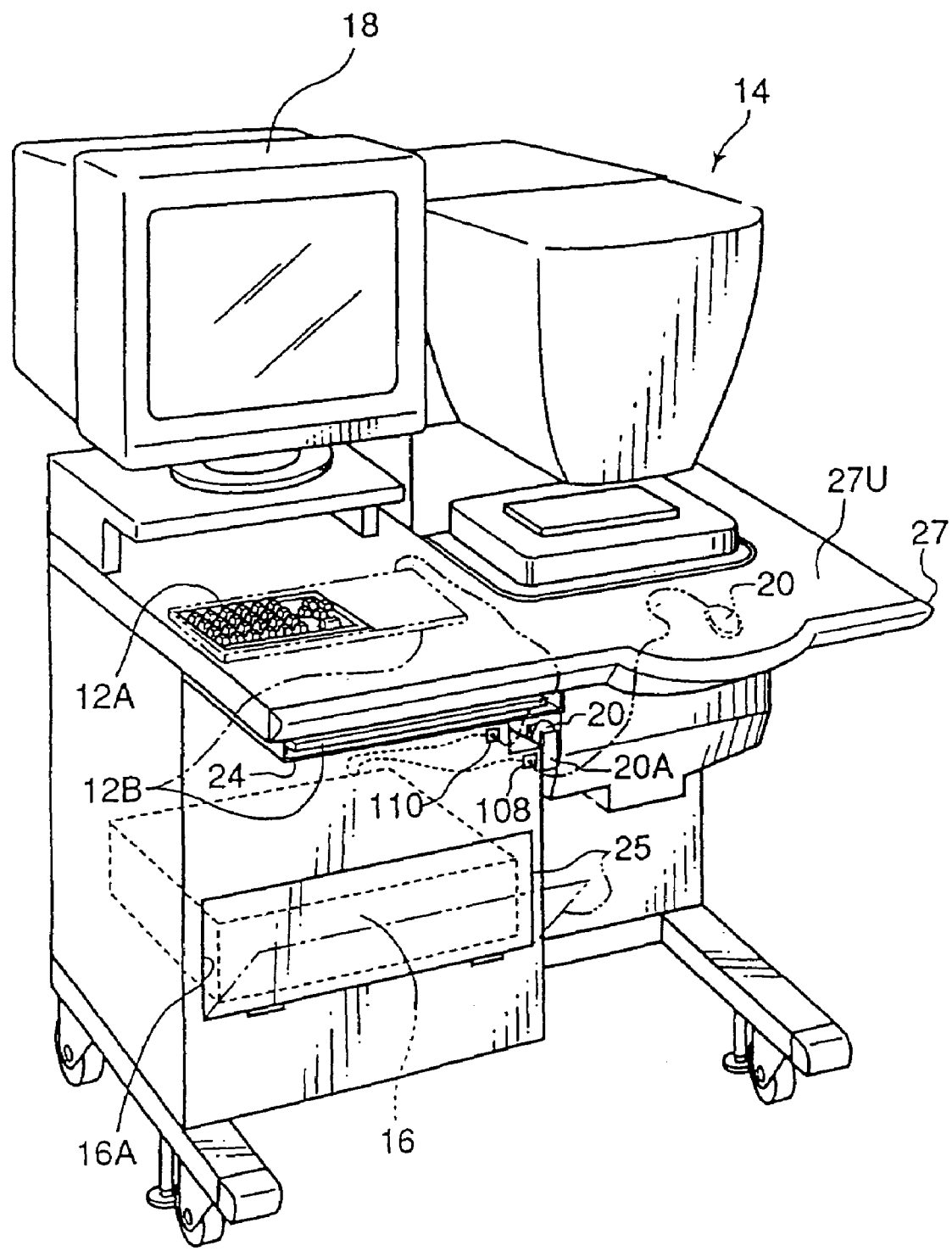
FIG. 1 is a diagram showing the appearance of an image reading apparatus according to an embodiment of the present invention.

As shown in FIG. 1, an image reading apparatus according to the present embodiment comprises a line CCD scanner 14. The line CCD scanner 14 is arranged on a work table 27 having an image processing section 16, a mouse 20, two types of keyboards 12A, 12B and a display unit 18.

The keyboard 12A is embedded in the work surface 27U of the work table 27. The other keyboard 12B, when not in use, is placed in a drawer 24 of the work table 27, and when used, pulled out of the drawer 24 and laid over the keyboard 12A. At this time, the cord of the keyboard 12B is connected to a jack 110 connected to the image processing section 16.

The cord of the mouse 20 is connected to the image processing section 16 via a hole 108 formed in the work table 27. The mouse 20 is stored in a mouse holder 20A when not in use, and when in use, taken out of the mouse holder 20A and placed on the work table 27U.

The image processing section 16 is accommodated in a accommodation portion 16A included in the work table 27, and is closed therein by a door 25. When the door 25 is opened, the image processing section 16 can be taken out.

The line CCD scanner 14 is for reading a film image recorded on a photographic film such as a reversal film (positive film) or a negative film. Film images on a photographic film of size 135, a photographic film of size 110, a photographic film formed with a transparent magnetic layer (a photographic film of size 240, or what is called APS film), or a photographic film of sizes 120 and 220 (brownie size) can be read, for example. The line CCD scanner 14 reads with the line CCD, the film image to be read and outputs image data.

The image processing section 16 is supplied with the image data output from the line CCD scanner 14 on the one hand, and after subjecting the input image data to various types of image processing such as correction, outputs them as recording image data to a laser printer unit (not shown).

Figure 2:
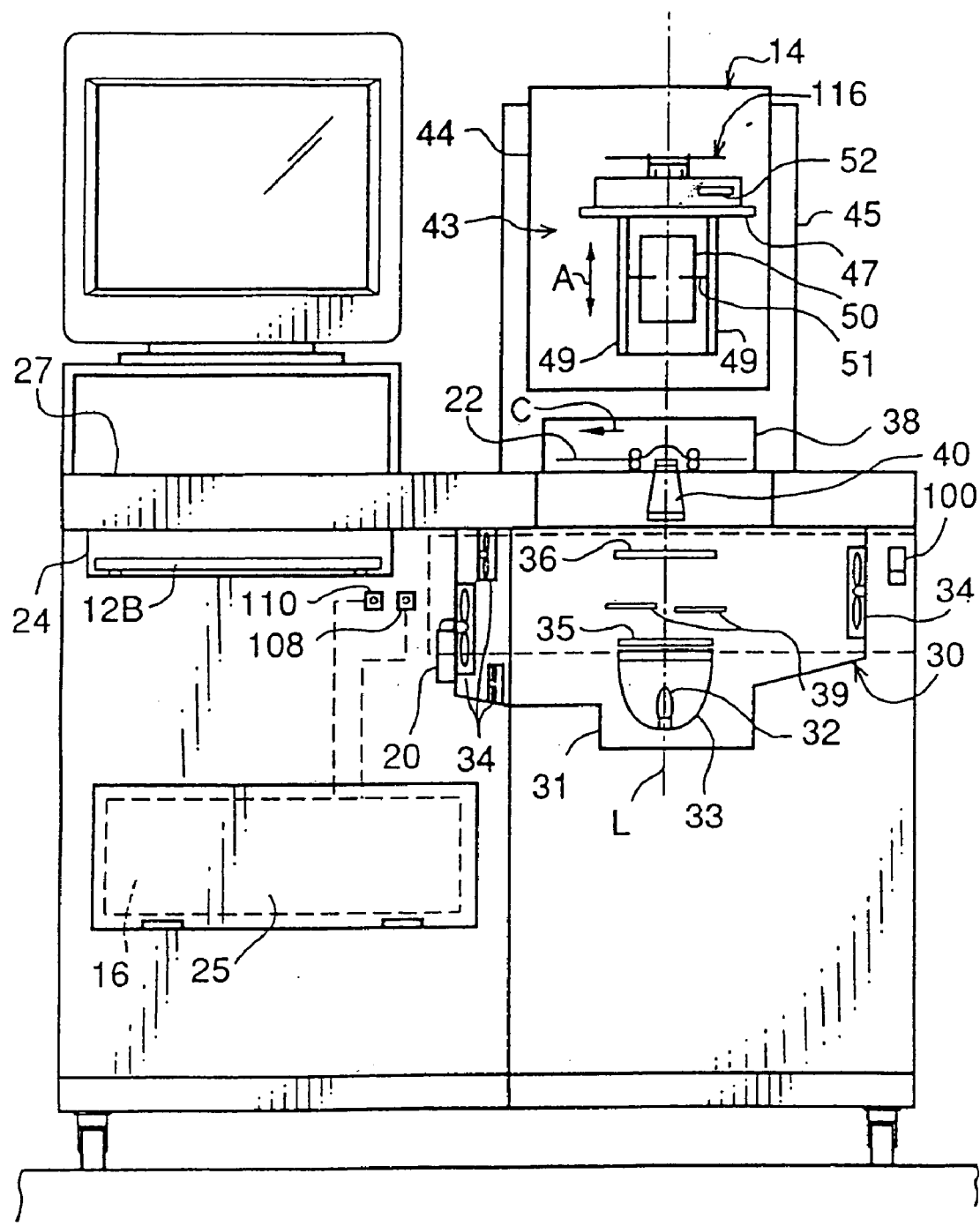
FIG. 2 is a front sectional view of an optical system of an image reading apparatus according to the embodiment of the present invention.
Figure 3:
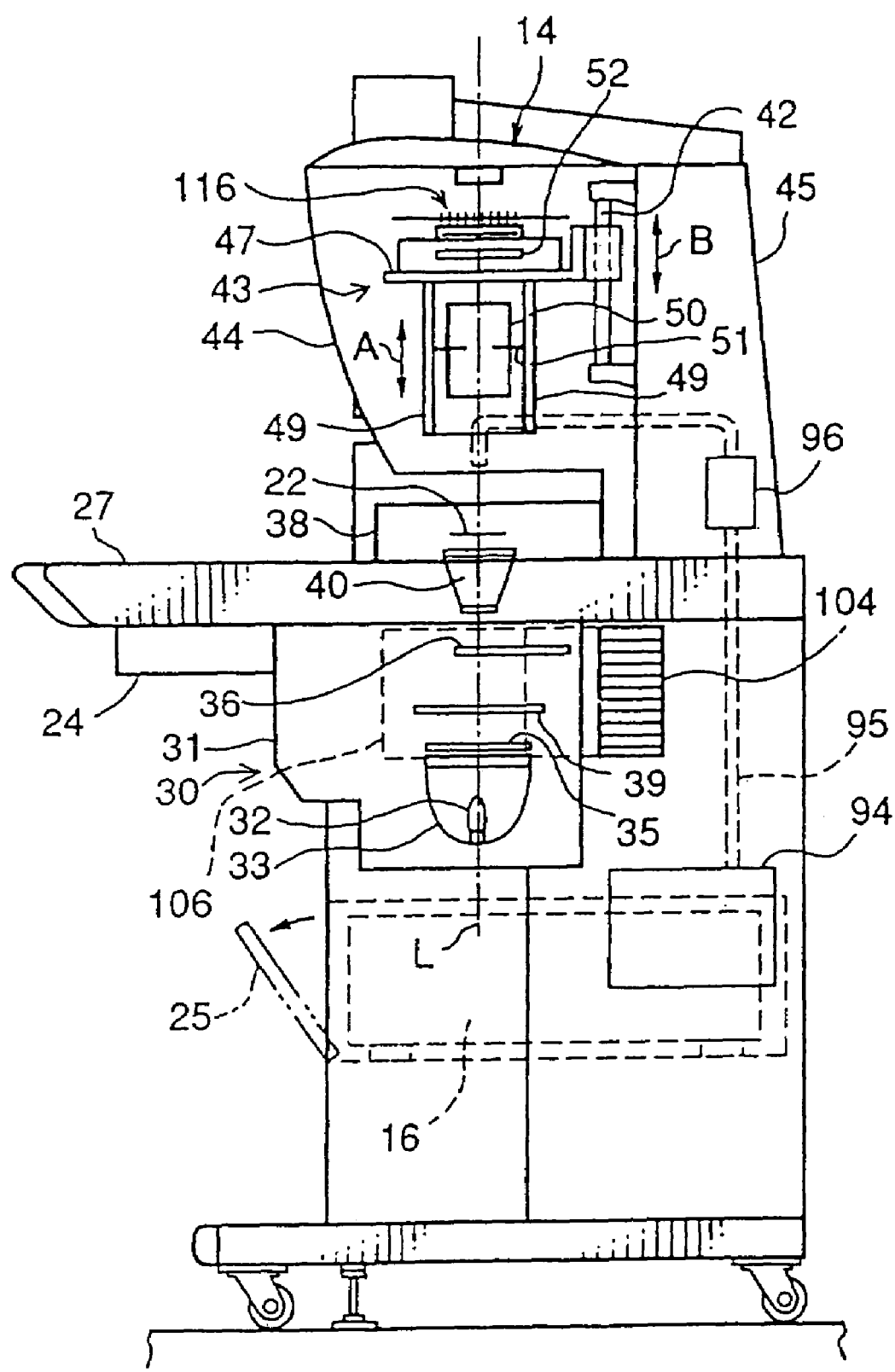
FIG. 3 is a side sectional view of an optical system of an image reading apparatus according to the embodiment of the present invention.

As shown in FIGS. 2 and 3, the optical system of the line CCD scanner 14 includes a light source section 30 arranged under the work table 27, a diffusion box 40 supported on the work table 27, a film carrier 38 set in the work table 27 and a reading section 43 arranged on the side of the work table 27 away from the light source section 30.

The light source section 30 is housed in the casing 31, which has arranged therein a lamp 32 such as a halogen lamp or a metal halide lamp. The lamp 32 is held on an X-Y stage (not illustrated) movable in two directions, i.e. longitudinally (direction of conveying) and transversely with respect to the photographic film 22. By moving the position of the X-Y stage, the position of the lamp 32 can be finely adjusted.

A reflector 33 is provided at the periphery of the lamp 32. A portion of the light emitted from the lamp 32 is reflected by the reflector 33, so as to be reflected off in a given direction. Plural fans 34 are provided at the sides of the reflector 33. The fans 34 are operated while the lamp 32 is lit, so as to prevent the interior of the casing 31 from overheating.

A UV/IR cutting filter 35, a diaphragm 39, and a turret 36 disposed along the optical axis L of the light reflected from the reflector 33 in that order at the side of the reflector 33 from which light is reflected. By cutting light of wavelengths of ultraviolet and infrared regions, the UV/IR cutting filter 35 prevents chemical changing of the photographic film 22 and improves the reading accuracy by preventing an increase in temperature. The diaphragm 39 adjusts the amount of the light from the lamp 32 and the amount of light reflected by the reflector 33. An unillustrated balance filter 36N for negative films and a balance filter 36P for reversal films are fitted into the turret 36. These balance filters appropriately set, in accordance with the type of photographic film (negative film/reversal film), the color components of the light which reaches the photographic film 22 and the reading section 43.

Figure 4A:
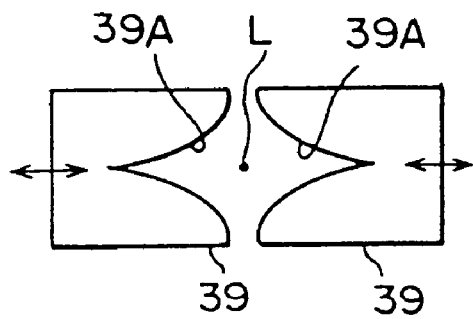
FIG. 4A is a plan view showing an example of a diaphragm.

The diaphragm 39 is formed from a pair of plate-like members which are disposed so as to sandwich the optical axis L therebetween. The pair of plate-like members are slidable in directions of approaching and moving away from each other. As shown in FIG. 4A, the plate members of the diaphragm 39 are each formed with a notch 39A at an end thereof so that the sectional area along the direction changes continuously from one end toward the other along the sliding direction. The plate members are arranged in such a position that the sides thereof formed with the notches face each other.

In the configuration described above, one of the filters (36N, 36P) corresponding to the type of photographic film is located on the optical axis L to secure the desired components of the light, and the amount of the light passing through the diaphragm 39 is adjusted to the desired amount according to the position of the diaphragm 39.

The diffusion box 40 is formed such that the length thereof along the direction the photographic film 22 is conveyed by the film carrier 38 decreases toward the top portion thereof, i.e., in the direction nearing the photographic film 22 (see FIG. 2), and such that the length of the diffusion box 40 in the direction orthogonal to the direction the photographic film 22 is conveyed (i.e., the length along the transverse direction of the photographic film22) increases (see FIG. 3). Further, light diffusing plates (not shown) are mounted to both the light entering side and the light exiting side of the diffusion box 40. The above-described diffusion box 40 is used for a 135 size photographic film. Other diffusion boxes (not shown) of configurations corresponding to other types of photographic films may also be readied for use.

The light which enters the diffusion box 40 is directed toward the film carrier 38 (i.e., the photographic film 22), is made into slit light whose longitudinal direction is the transverse direction of the photographic film 22, is made into diffused light by the light diffusing plates, and exits from the diffusion box 40. In this way, by making the light which exits from the diffusion box 40 diffused light, there is less unevenness of the amount of light illuminated onto the photographic film 22, slit light of a uniform amount of light is illuminated onto the film image, and even if the film image is damaged, the damage is difficult to notice.

A film carrier 38 and diffusion box 40 are readied for each type of the photographic film 22, and selected in accordance with the photographic film 22.

A long, thin hole (not shown), whose length along the transverse direction of the photographic film 22 is wider than the width of the photographic film 22, is provided in each of the top surface and the bottom surface of the film carrier 38 at positions corresponding to the optical axis L. The slit light from the diffusion box 40 is illuminated onto the photographic film 22 via the hole in the bottom surface of the film carrier 38. The light which passes through the photographic film 22 passes through the hole in the top surface of the film carrier 38 and reaches the reading section 43.

A guide (not shown) which guides the photographic film 22 is provided at the film carrier 38 so that the slit light from the diffusion box 40 curves at the illumination position (reading position). In this way, the planarity of the photographic film 22 at the reading position can be ensured.

The diffusion box 40 is supported such that the top surface thereof is near the reading position. Thus, a cut-out portion is provided in the bottom surface of the film carrier 38 so that the film carrier 38 and the diffusion box 40 do not interfere with each other when the film carrier 38 is loaded.

The film carrier 38 is formed so as to be able to convey the photographic film 22 at various different speeds in accordance with whether prescanning or fine scanning is being carried out, and in accordance with the density of the film image being fine scanned.

The reading section 43 is accommodated within a casing 44. A loading stand 47, on whose top surface a line CCD 116 is mounted, is provided within the casing 44. A lens cylinder 49 hangs downward from the loading stand 47. A lens unit 50 is supported within the lens cylinder 49. The lens unit 50 is slidable in the directions of arrow A so as to approach and move away from the work table 27 in order to adjust the magnification (e.g., reduction, enlargement). A support frame 45 is provided at the work table 27. The loading stand 47 is supported by the guide rail 42 which are mounted to the support frame 45, such that the loading stand 47 is slidable in the directions B of approaching and moving away from the work table 27 in order to ensure the conjugate length when the magnification is changed or during autofocusing.

Figure 4B:
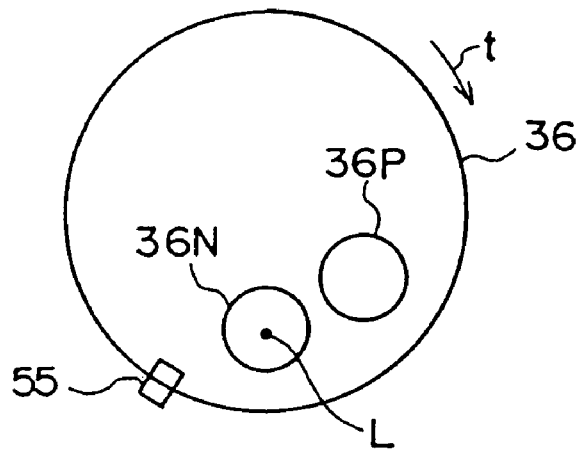
FIG. 4B is a plan view showing an example of a turret.
Figure 4C:
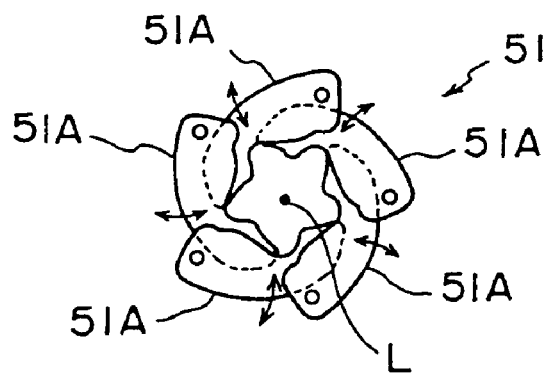
FIG. 4C is a plan view showing an example of a lens diaphragm.

The lens unit 50 is formed from a plurality of lenses, and a lens diaphragm 51 is provided between the plural lenses. As illustrated in FIG. 4C, the lens diaphragm 51 is provided with plural diaphragm plates 51A which are formed in a substantially C-shaped configuration. Each of the diaphragm plate 51A are arranged uniformly at the periphery of the optical axis L. An end of each of the diaphragm plates 51A is supported on a pin, and is rotatable around the pin. The plural diaphragm plates 51A are connected via an unillustrated link. Each of the diaphragm plates 51A are rotated in the same direction when driving force from a lens diaphragm driving motor (which will be explained later) is transmitted thereto. As the diaphragm plates rotate, the area of the portion which is not cut off from light by the diaphragm plates (a substantially star-shaped portion in FIG. 4C) is changed around the optical axis L, such that the amount of light which passes through the lens diaphragm 51 changes.

In the line CCD 116, a plurality of photoelectric converting elements such as CCD cells or photodiodes are provided in a line along the transverse direction of the photographic film 22, and sensing portions provided with electronic shutter mechanisms are provided in three parallel lines spaced apart from one another. A color separating filter of R, G or B is mounted to the light-incident side of each sensing portion. (Namely, the line CCD 116 is a so-called 3-line color CCD.) Further, plural transmitting portions are provided in vicinities of each of the sensing portions so as to correspond to the sensing portions. The charge accumulated in each CCD cell of the sensing portions is transmitted in order via the corresponding transmitting portion.

Figure 4D:
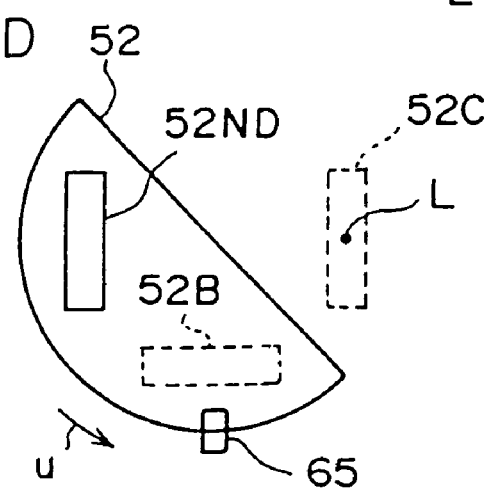
FIG. 4D is a plan view showing an example of a CCD shutter.

A CCD shutter 52 is provided at the light-incident side of the line CCD 116. As illustrated in FIG. 4D, an ND filter 52ND is fit into the CCD shutter 52. The CCD shutter 52, which rotates in the direction of arrow u, switches to one of: a completely closed state (a portion 52B or the like, where the ND filter 52ND is not fitted, is positioned at a position 52C, which contains the optical axis L), which is for protecting the color separation filter provided in the line CCD 116 and for dark correction and in which the CCD shutter 52 blocks light which would otherwise be incident on the line CCD 116 for dark correction; a completely open state (the position of FIG. 4D) which is for regular reading and for light correction and in which the CCD shutter 52 allows light to be incident onto the line CCD 116; and a reduced light state (the ND filter 52ND is positioned at the position 52C), which is for linearity correction and in which the light to be incident on the line CCD 116 is reduced by the ND filter 52ND for linearity correction.

Figure 5:
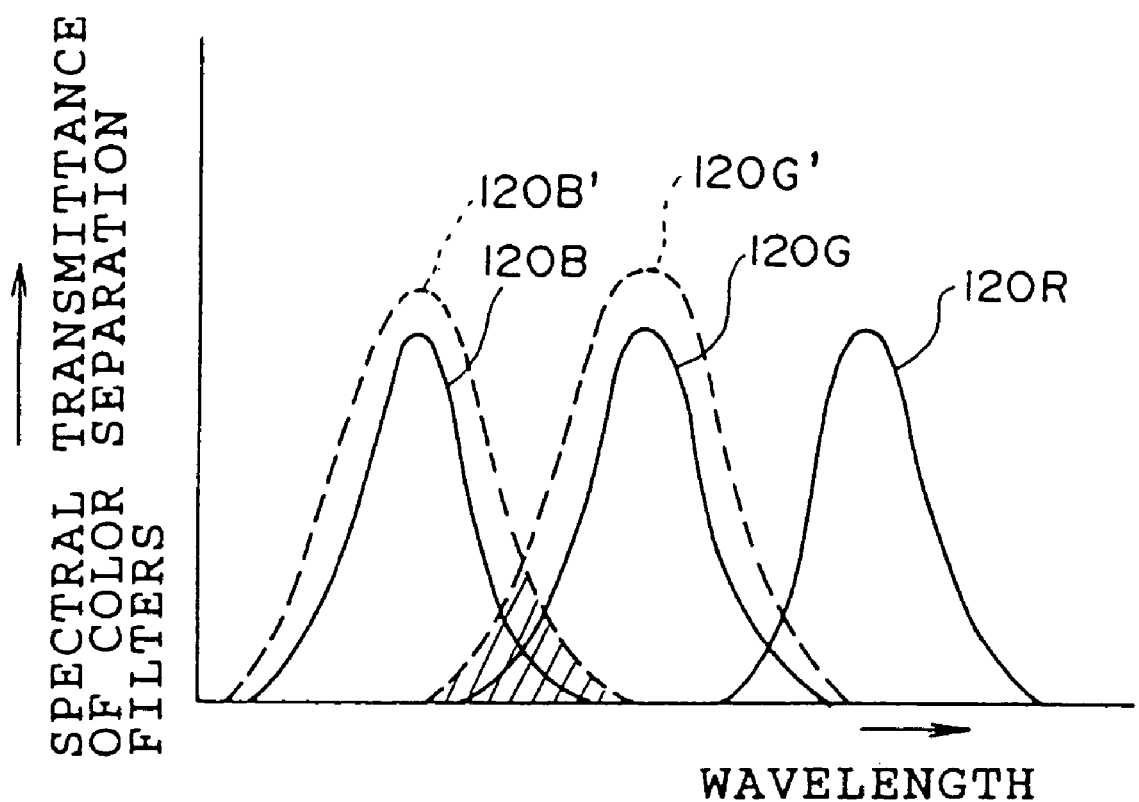
FIG. 5 is a graph showing the change of the spectral transmittance of each color separation filter included in a line CCD due to the fading thereof.

The color separation filters of the colors R, G, and B arranged in the line CCD 116 are gradually discolored by the light incident thereon. Assume that the spectral transmittance of the color separation filters of R, G, and B before fading are 120R, 120G, and 120B, respectively, as shown in FIG. 5. In the case where the light is incident mainly on the color separation filters G and B so that the color separation filters of G and B are discolored considerably, the spectral transmittance of the color separation filters of G and B become 120G' and 120B', respectively, and thus increase overall in comparison with the spectral transmittances 120G and 120B, respectively, before fading. In this case, the area of the overlapped portion (the hatched portion in FIG. 5) of the spectral transmittance 120G' and 120B' after fading is larger than that before fading. Therefore, the separated light of G and the separated light of B become difficult to define from each other, with the result that the quality of the image ultimately obtained deteriorates.

In view of this, with the image reading apparatus according to the present embodiment, the CCD shutter 52 is completely closed to prevent the fading of the color separation filters of the line CCD 116 in cases where the incidence of light on the line CCD 116 is not required other than when the image is read or the like.

As shown in FIG. 3, a compressor 94 for generating cooling air for cooling the photographic film 22 is arranged on the work table 27. The cooling air generated by the compressor 94 is guided and supplied to a reading section (not shown) of the film carrier 38 by a guide pipe 95. As a result, the area of the photographic film 22 located at the position corresponding to the reading section can be cooled. Further, the guide pipe 95 is laid through a flow rate sensor 96 for detecting the flow rate of the cooling air.

The film carrier 38 and the diffusion box 40 according to the present embodiment are selectively used according to the type of the photographic film 22 in principle. In the event that the diffusion box cannot be used according to the type of the photographic film to be read due to the loss or damage or some other reason and another diffusion box is available for use, however, the following corrective measure is taken for the image reading apparatus according to the present embodiment.

Specifically, in the image reading apparatus according to the present embodiment, the information on the amount of light emitted from each diffusion box is stored for each diffusion box prepared in accordance with the type of the photographic film. The difference in light amount between the diffusion box for the photographic film to be read and the diffusion box actually used is determined, and the charge storage time of the line CCD 116 is changed in accordance with the light amount difference thereby to make available for use the diffusion box for other than the photographic film to be read.

Specifically, assume, for example, that the photographic film of size 135 is read using a diffusion box for the photographic film of size 120. The difference in emitted light amount is determined between the diffusion box for the photographic film of size 120 and the diffusion box for the photographic film of size 135. The amount of emitted light of the diffusion box for the photographic film of size 120 is smaller than that of the diffusion box for the photographic film of size 135. In this case, therefore, the charge storage time of the line CCD 116 is lengthened than normal in accordance with the light amount difference thereby to make up for the reduction in the light amount.

As described above, in the image reading apparatus according to the present embodiment, one diffusion box is made available for use to read a plurality of types of photographic film.

Figure 6:
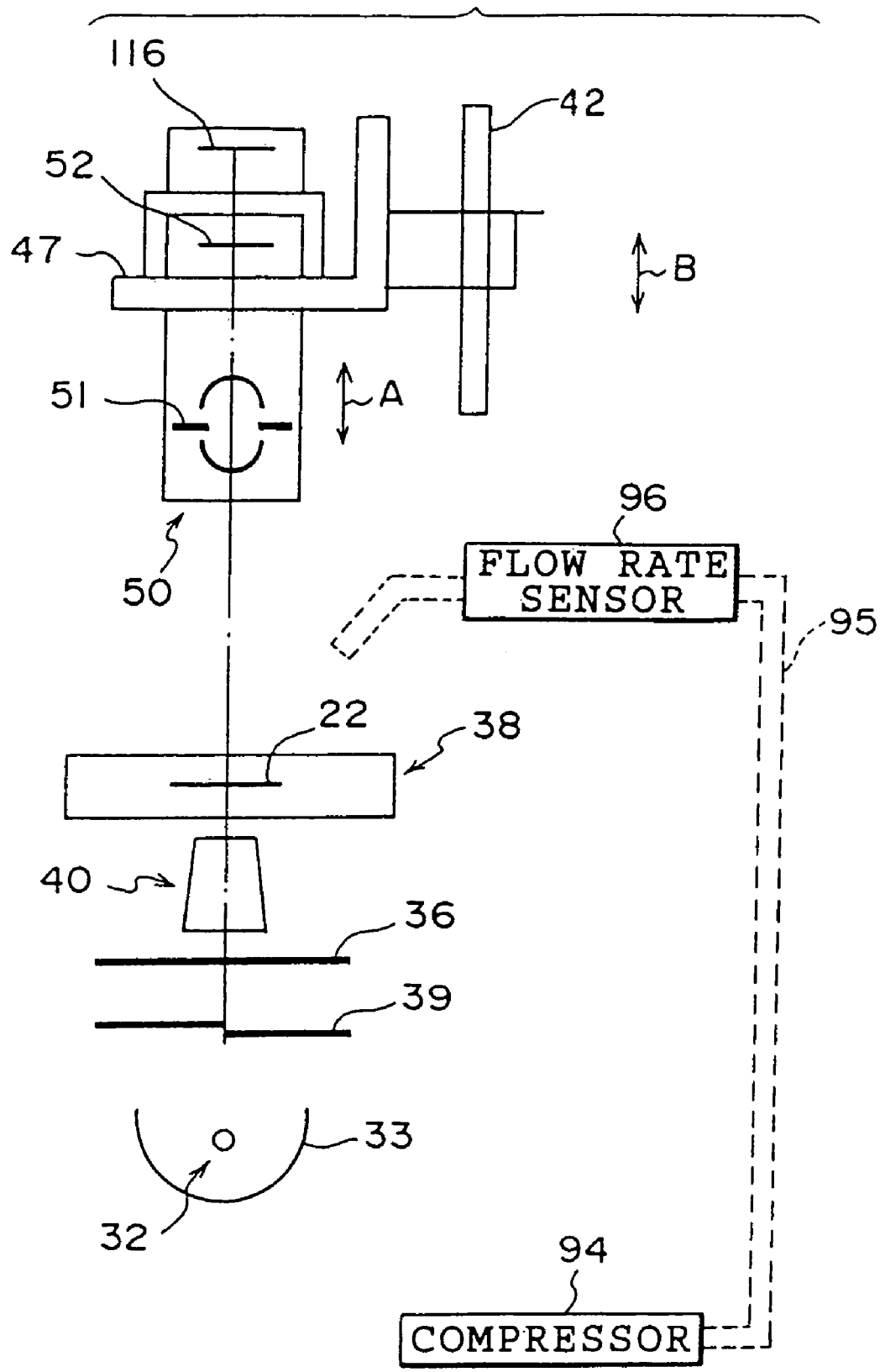
FIG. 6 is a schematic diagram showing only the main portions of the optical system of each of the image reading apparatuses according to the first through third embodiments.
Figure 7:
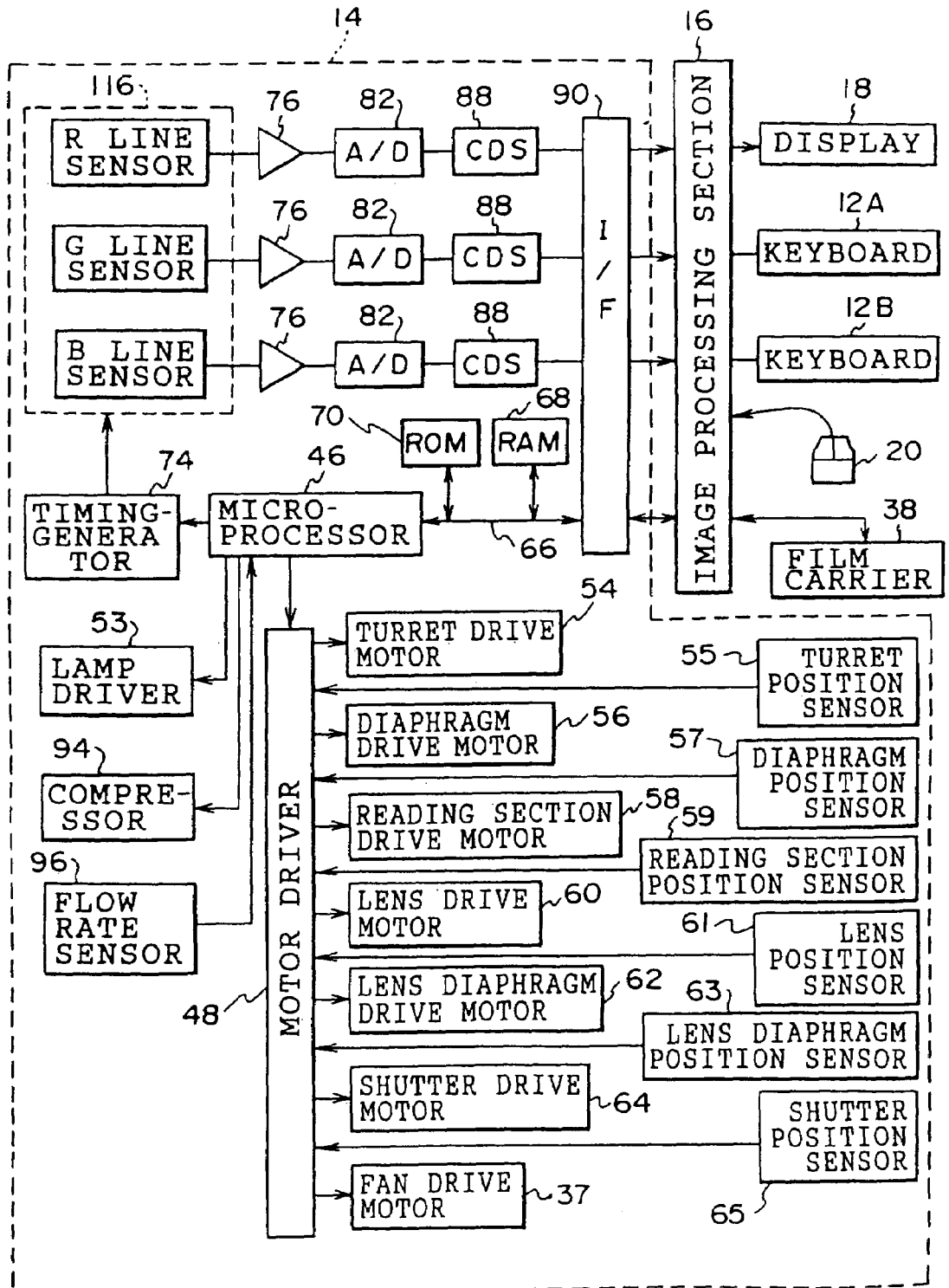
FIG. 7 is a block diagram showing a general structure of an electric system of an image processing section and a line CCD scanner of each of the image reading apparatuses according to the first, third and fourth embodiments.

Now, a general structure of the electric system of the line CCD scanner 14 and the image processing section 16 will be explained using FIG. 7 with reference to the essential parts of the optical system of the line CCD scanner 14 shown in FIG. 6.

The line CCD scanner 14 has a microprocessor 46 which governs the overall control of the line CCD scanner 14. A RAM 68 (e.g., an SRAM) and a ROM 70 (e.g., a ROM whose stored contents are rewritable) are connected to the microprocessor 46 via a bus 66. A lamp driver 53, the compressor 94, the flow rate sensor 96, and a motor driver 48 are connected to the microprocessor 46. The lamp driver 53 turns the lamp 32 on and off in accordance with instructions from the microprocessor 46. When the film image of the photographic film 22 is being read, the microprocessor 46 operates the compressor 94 to supply cooling air to the photographic film 22. The flow rate of the cooling air is detected by the flow rate sensor 96, and the microprocessor 46 senses abnormalities.

A turret driving motor 54 and a turret position sensor 55 (see FIG. 4B) are connected to the motor driver 48. The turret driving motor 54 drives the turret 36 to rotate in the direction of arrow t of FIG. 4B such that one of the balance filter for negative films or the balance filter for reversal films of the turret 36 is positioned on the optical axis L. The turret position sensor 55 detects a reference position (an unillustrated notched portion) of the turret 36. Also connected to the motor driver 48 are a diaphragm driving motor 56 for sliding the diaphragm 39, a diaphragm position sensor 57 which detects the position of the diaphragm 39, a reading section driving motor 58 which slides the loading stand 47 (i.e., the line CCD 116 and the lens unit 50) along the guide rail 42, a reading section position sensor 59 for detecting the position of the loading stand 47, a lens driving motor 60 which slides the lens unit 50 along the lens cylinder 49, a lens position sensor 61 for detecting the position of the lens unit 50, a lens diaphragm driving motor 62 for rotating the diaphragm plates 51A of the lens diaphragm 51, a lens diaphragm position sensor 63 for detecting the position of the lens diaphragm 51 (the position of the diaphragm plates 51A), a shutter driving motor 64 for switching the CCD shutter 52 between the completely closed state, the completely open state, and the light-extinguishing state, a shutter position sensor 65 for detecting the position of the shutter, and a fan driving motor 37 for driving the fan 34.

When prescanning (preliminary reading) and fine scanning (actual reading) are carried out by the line CCD 116, on the basis of the positions of the turret 36 and the diaphragm 39 detected by the turret position sensor 55 and the diaphragm position sensor 57, the microprocessor 46 rotates the turret 36 by the turret driving motor 54 and slides the diaphragm 39 by the diaphragm driving motor 56 so as to adjust the light illuminated onto the film image.

When prescanning (preliminary reading) and fine scanning (actual reading) are carried out by the line CCD 116, on the basis of the positions of the turret 36 and the diaphragm 39 detected by the turret position sensor 55 and the diaphragm position sensor 57, the microprocessor 46 rotates the turret 36 by the turret driving motor 54 and slides the diaphragm 39 by the diaphragm driving motor 56 so as to adjust the light illuminated onto the film image.

The microprocessor 46 determines the zoom magnification in accordance with the size of the film image, whether trimming is to be carried out, and the like. The microprocessor 46 slides the loading stand 47 by the reading section driving motor 58 on the basis of the position of the loading stand 47 detected by the reading section position sensor 59, so that the film image is read by the line CCD 116 at the determined zoom magnification. Further, the microprocessor 46 slides the lens unit 50 by the lens driving motor 60 on the basis of the position of the lens unit 50 detected by the lens position sensor 61.

When focussing control to make the light-receiving surface of the line CCD 116 coincide with the film image image-forming position by the lens unit 50 is carried out (i.e., when autofocusing control is carried out), the microprocessor 46 slides only the loading stand 47 by the reading section driving motor 58. This focussing control can be carried out such that, for example, the contrast of the film image read by the line CCD 116 is a maximum (what is known as the image contrast method). Alternatively, a distance sensor which measures by infrared rays or the like the distance between the photographic film 22 and the lens unit 50 (or the line CCD 116) may be provided, and focussing control can be carried out on the basis of the distance detected by the distance sensor instead of on the basis of the data of the film image.

A timing generator 74 is connected to the line CCD 116. The timing generator 74 generates various types of timing signals (clock signals) for operating the line CCD 116, an A/D converter 82 which will be described later, and the like. The signal output terminal of the line CCD 116 is connected to the A/D converter 82 by an amplifier 76. The signal outputted from the line CCD 116 is amplified by the amplifier 76 and is converted into digital data at the A/D converter 82.

The output terminal of the A/D converter 82 is connected to the image processing section 16 via a correlation double sampling circuit (CDS) 88 and an interface (I/F) circuit 90 in that order. At the CDS 88, feedthrough data which expresses the level of a feedthrough signal and pixel data expressing the level of a pixel signal are respectively sampled, and the feedthrough data is subtracted from the pixel data for each pixel. The results of calculation (pixel data which accurately corresponds to the amount of accumulated charge in each CCD cell) are output successively to the image processing section 16 via the I/F circuit 90 as scan image data.

Because the R, G, B photometric signals are outputted in parallel from the line CCD 116, three signal processing systems, each having an amplifier 76, an A/D converter 82 and a CDS 88, are provided. The R, G, B image data which is the scan image data are inputted in parallel from the I/F circuit 90 to the image processing section 16.

Further, the image processing section 16 is connected with the display unit 18, the keyboards 12A, 12B, the mouse 20 and the film carrier 38.

The image processing section 16 performs the dark correction and the bright correction of the image data of R, G, B applied thereto in parallel from the line CCD scanner 14.

The dark correction is for canceling the dark current flowing in the line CCD 116 in the state where no light enters the light-incident side of the line CCD 116. With the light-incident side of the line CCD 116 shielded from light by the CCD shutter 52, the data input from the line CCD scanner 14 (the data indicating the dark output level of each cell of the sensing portions of the line CCD 116) are stored for each cell, and the line CCD 116 reads the photographic film 22, so that the dark output levels of the cells corresponding to each pixel are corrected by being subtracted from the image data input from the line CCD scanner 14.

The bright correction, on the other hand, is for correcting the variations in the photoelectric conversion characteristic of the line CCD 116 between cell units. In the state where an adjusting film image with a predetermined density over the entire screen is set in the line CCD scanner 14, the adjusting film image is read with the line CCD 116. In this way, the line CCD scanner 14 reads the adjusting film image so that based on the image data (the density variations with the pixels indicated by this image data is attributable to the variations in the photoelectric conversion characteristic of each cell) of the adjusting film image input from the line CCD scanner 14, the gain (bright correction data) is determined for each cell. Then the image data of the film image to be read input from the line CCD scanner 14 is corrected for each pixel in accordance with the gain determined for each cell.

Also, the image processing section 16 performs various image processing operations including gradation conversion, color conversion, hyper-tone processing for compressing the gradation of the ultralow frequency luminance components of the image, and the hyper-sharpness process for enhancing the sharpness while suppressing graininess.

The keyboards 12A, 12B and the mouse 20 correspond to the designating means according to the present invention, the photographic film 22 to the original to be read according to the present invention, the lamp 32 to the light source according to the present invention, the film carrier 38 to the conveying means according to the present invention, the microprocessor 46 to the control means according to the present invention, and the line CCD 116 to the image sensor according to the present invention.

Figure 8:
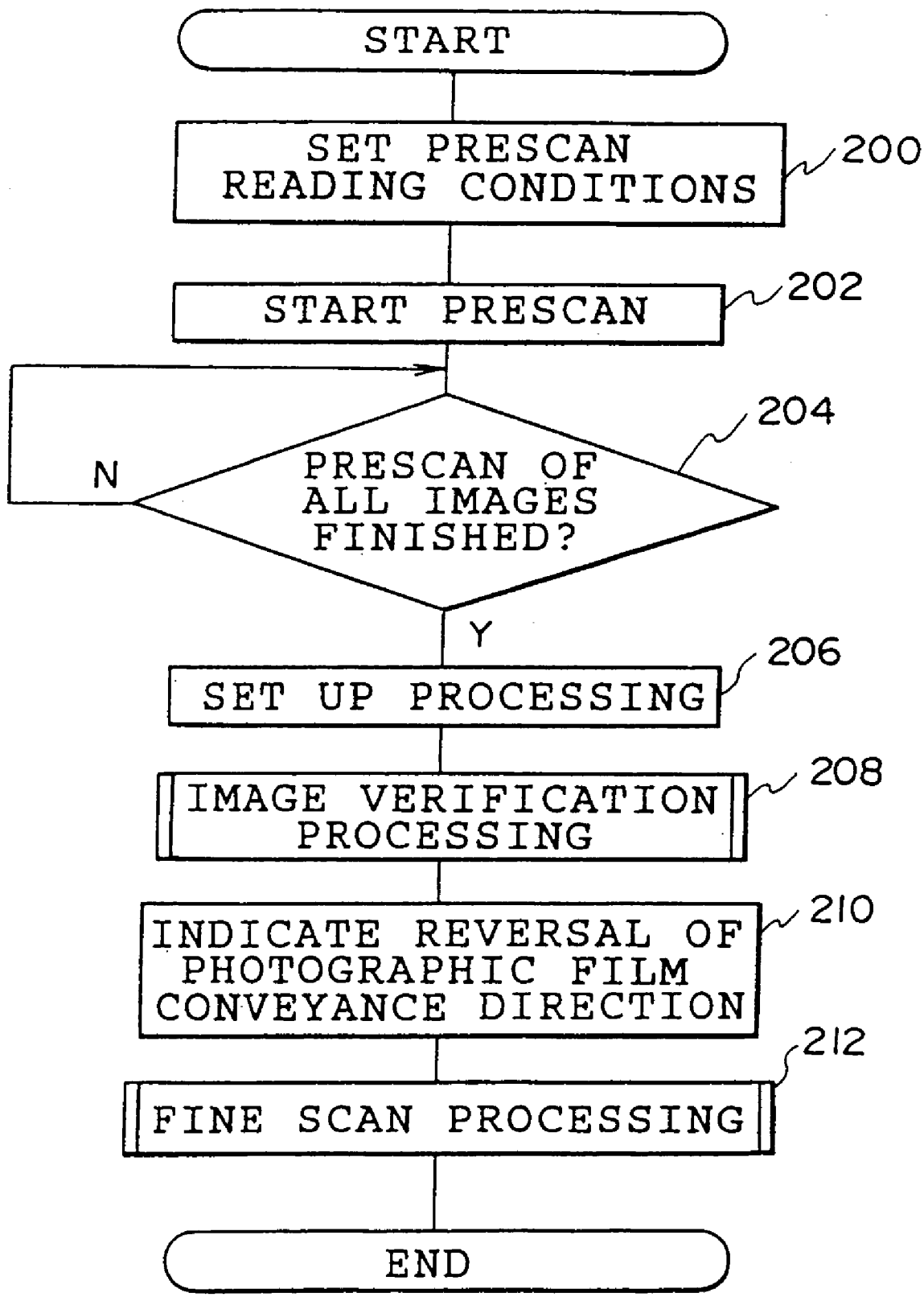
FIG. 8 is a flowchart of the image reading processing executed by a microprocessor of the line CCD scanner of the image reading apparatus according to the first embodiment of the present invention.

Now, with reference to FIG. 8, an explanation will be given of the image reading process for the photographic film 22 executed by the microprocessor 46 of the line CCD scanner 14. FIG. 8 is a flowchart for the image reading process executed by the microprocessor 46 at the time of reading the image of the photographic film 22. Also, the line CCD scanner 14 has predetermined modes for reading the photographic film, including the "prescan model" and the "fine scan mode". The state of each part of the line CCD scanner 14 in each mode is also predetermined. Further, according to this invention, an explanation will be given of the case in which the photographic film 22 is a single negative film.

In step 200 of FIG. 8, the process proceeds to "prescan mode" and the operation of each part is controlled according to the state of the respective part predetermined as a "prescan mode" in such a manner that the photographic film 22 is prescanned under predetermined reading conditions.

Specifically, the lamp 32 is turned on by the lamp driver 53, the diaphragm 39 is moved to the prescan position by the diaphragm drive motor 56, the turret 36 is rotated to the negative film position (the position where the balance filter 36N for the negative film is located on the optical axis L) by the turret drive motor 54, the mount 47 and the lens unit 50 are slid by the reading section drive motor 58 and the lens drive motor 60 in such a manner that the zoom magnification due to the lens unit 50 is 1.0, the lens diaphragm 51 is moved to the full open position by the lens diaphragm drive motor 62, and the CCD shutter 52 is moved to the full open position by the shutter drive motor 64. Also, the shortest value t is set as the operation time of the electronic shutter of the line CCD 116 (the reading cycle (charge storage time) per line due to the line CCD 116) for the timing generator 74, and the maximum conveying speed of the photographic film 22 is set to 5×v (the conveying speed five times as high as the conveying speed v for the fine scan of the normal film image) for the film carrier 38. As a result, the prescan for the photographic film 22 is performed at high speed with a comparatively low resolution thereby to complete the process within a short time.

In the next step 202, the film carrier 38 is instructed to convey the photographic film 22 in a predetermined direction (in the direction along arrow C in FIG. 2), and the photographic film 22 being conveyed at the highest conveying speed (5×v) is read with the shortest read cycle (t) with the line CCD 116. The signals output from the line CCD 116 are sequentially A/D converted and sequentially output as prescan data to the image processing section 16 thereby to start the prescan process.

The next step 204 judges whether the prescan has been conducted to the tail end of the photographic film 22 and waits until the judgment is affirmative.

During the prescan, the image processing section 16 sequentially stores the image data input from the line CCD scanner 14 in a storage unit not shown, and at the time point when the image data corresponding to a plurality of frame images are stored, the edge positions of the ends (upstream and downstream sides) along the direction of conveying of the photographic film 22 of the film imaged recorded in the photographic film 22 are determined based on the image data stored.

The determination of the edge positions, as proposed by the present applicant in JP-A No. 8-304932, JP-A No. 8-304933, JP-A No. 8-304934 and JP-A No. 8-304935, is made in such a manner that based on the density value of each pixel indicated by the prescan data, the density change value along the longitudinal direction of the film is calculated for each pixel, so that the density change value along the longitudinal direction of each pixel is accumulated in units of line along the transverse direction of the film, and the accumulated values are compared for each line. Also, in the case where the photographic film 22 is the APS film, the area from the position perforated to the position where an edge is likely to exist is set as a search range, and the edges are searched for in the search range, thereby making it possible to shorten the time required for determining the edge position.

Also, in the image processing section 16, the frame position of the film image corresponding to the position of perforation is determined based on the edge position determined as above, and the frame position thus determined is stored in a storage unit not shown. Also, based on this frame position, the image data in the area where the film image is recorded is cut out from the image data stored thus far, and stored in a storage unit not shown.

When prescanning to the tail end of the photographic film 22 has been completed (i.e., when the judgment in step 204 of FIG. 8 is affirmative), step 206 calculates a predetermined image feature amount of the film image from the prescanned image data stored in a storage unit not shown by the image processing section 16 at the time of prescan. The predetermined feature amount includes the color balance value of the film image (more specifically, the ratio of the minimum density value (maximum luminance value) for each color component of the film image)

In step 206, based on the image feature amount thus calculated, the image processing conditions for the fine scan image data and the type of the film image (size, density type) are set by calculation.

In the case where the photographic film 22 to be read is the photographic film of size 135, the size of the film image (in this case, the frame size of the film image) is included in the image recording range for the film image of standard size, for example, while for the film image of the non-standard size such as panorama size, the size of the film image is determined according to whether the density and hue of a predetermined portion out of the image recording range is the one corresponding to the non-exposed portion (the transparency for the negative film).

As an alternative, as disclosed in JP-A No. 8-304932, JP-A No. 8-304933, JP-A No. 8-304934 and JP-A No. 8-304935, the density change value along the transverse direction of the film is calculated for each pixel based on the density value per each pixel indicated by the image data at the time of prescan, and the density change value along the transverse direction of the film for each pixel is accumulated for each line along the longitudinal direction of the film, and the accumulated values for each line are compared thereby to determine the size (aspect ratio) of the film image. As another alternative, the image is binarized with a threshold value determined from a density histogram, and the probability of existence of the image in each area of the image is used for determination, or the judgment is based on the average value and the distribution of the density change value in the predetermined portion described above, or the methods described above may be combined.

Also, in the case where the photographic film to be read is the APS film, the size of the film image (in this case, the print size) can be determined by reading the print size magnetically recorded as data in the magnetic layer of the APS film.

The density type of the film image can be classified into the low density, normal density, high density and ultrahigh density, etc. for example, by comparing the average density, the maximum density, the minimum density, etc. with a predetermined value. Also, the image processing conditions include, for example, the image enlargement/compression ratio, the image processing conditions such as hyper-tone and hyper sharpness (specifically, the compression degree of the tone for the ultrahigh frequency luminance components of the image, the gain (degree of enhancement) for the high frequency component or the intermediate frequency component of the image, the tone conversion conditions, etc.

Upon complete setting of the type and the image processing conditions for all frame images as described above, the image verification process is executed in the next step 208. This image verification process will be explained with reference to the flowcharts of FIGS. 9A and 9B.

First, in step 300, the prescan image data and the image processing conditions of a predetermined number of film images are retrieved from the image processing section 16.

In the next step 302, the prescan image data and the image processing conditions for a given one of the film images are retrieved from the prescan image data and the image processing conditions, respectively, of a predetermined number of film images previously retrieved. The prescan image data thus retrieved are subjected to predetermined image processing (image enlargement/compression, tone conversion, hyper-tone processing, hyper sharpness processing, etc.) in accordance with the retrieved processing conditions. The predetermined image processing is equivalent to the image processing performed in the image processing section 16 for the fine scan image data. However, the prescan is for reading the film image with a lower resolution than for the fine scan, and the prescan image data has a smaller data amount than the fine scan image data. The image processing in step 302, therefore, is completed within a comparatively short time.

In the next step 304, the image data subjected to the image processing are corrected in accordance with the characteristics of the display unit 18 in such a manner that the image data displayed on the display unit 18 assumes substantially the same state (appearance) as the result of printing in the laser printing unit not shown, and the data thus corrected (simulation image data) are temporarily stored in the RAM 68.

In the next step 306, it is judged whether the processing mentioned above has been performed on a predetermined number of film images or not. In the case where the judgment is negative, the process returns to step 302, and step 300 repeats the process of steps 302, 304 for the film image not yet processed, among a predetermined number of images for which the prescan image data and the processing conditions have been retrieved in step 300.

Figure 10:
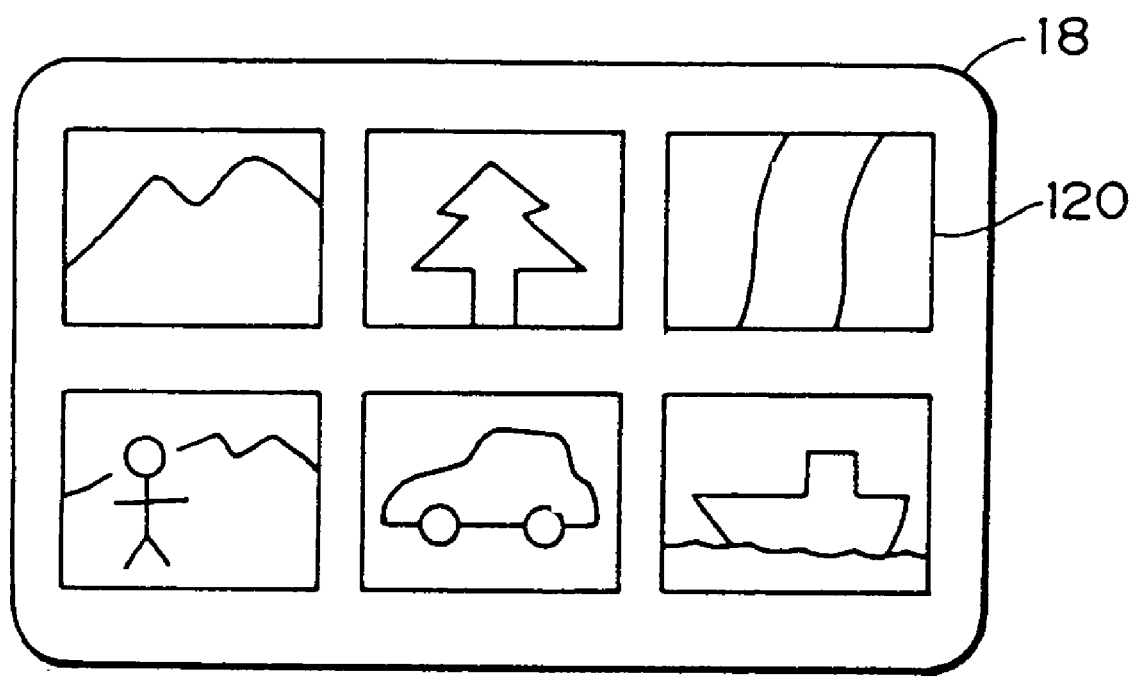
FIG. 10 is a schematic diagram showing an example of the display condition of a display unit for executing the image verification processing according to the embodiment of the present invention.

In the case where the judgment in step 306 is affirmative, the process proceeds to step 308, and based on the simulation image data of a predetermined number of film images, as shown in FIG. 10, for example, a predetermined number (6 in FIG. 10) of simulation images 120 indicating the result of each image processing conducted under the processing conditions set in the image processing section 16 for the image data of the predetermined number of film images are displayed on the display unit 18.

In the next step 310, it is judged whether or not the images to be processed among the simulation images 120 displayed on the display unit 18 have been completely designated by the operator or not, and in the case where the designation is complete, the process proceeds to step 318. In the case where the designation is not complete, on the other hand, the process proceeds to step 312. The images to be processed according to the present embodiment indicate those film images actually subjected to fine scan according to the present embodiment. Specifically, according to the present embodiment, in the case where the image reading process is executed at the same time as printing, the images to be processed include those images other than the images which are printed in waste, i.e. images considerably out of focus, images considerably underexposed or overexposed, or images otherwise difficult to identify the contents thereof. In the case where this image reading process is executed at the time of printing, the images printed constitute the images to be processed.

In step 312, the message requesting the operator to designate the images to be processed is issued by being displayed on the display unit 18 or otherwise. In this way, the operator is requested to designate the images to be processed.

As a result, among the simulation images 120 (see FIG. 10 also) displayed on the display unit 18, the operator designates the images to be processed by way of the keyboards 12A, 12B or the mouse 20. Specifically, in the case where the keyboard 12A or 12B is used, for example, a frame is displayed in advance in such a manner that a given one of the simulation images 120 displayed on the display unit 18 is surrounded by the frame, and one of the arrow keys not shown on the keyboard is depressed. In this way, the position of the frame is moved in such a manner as to surround the simulation image located in the direction indicated by the arrow key depressed, and at the time point when the simulation image to be processed is surrounded by the frame, a predetermined key such as the ENTER key on the keyboard is depressed thereby to designate the image to be processed. In the case where the mouse 20 is used, on the other hand, the image to be processed among the simulation images 120 displayed on the display unit 18 is designated by being pointed to with the mouse 20.

In the case where the image reading process is not executed at the same time as printing, as described above, the film image to be printed constitutes the image to be processed. In such a case, in view of the fact that the images to be printed are generally greater in number than the other images, the system structure is desirably such that the operator designates the other images than the images to be processed for power saving, so that the microprocessor 46 judges that the images other than those designated are the images to be processed. This structure is effective from the viewpoint of power saving in the case where the image reading process is executed at the same time as the printing and the number of the images to be printed is smaller than that of those not printed. Also, in the case where the image reading process is executed at the time of printing, the operator inputs the number of prints to be made from each of the images to be processed at the particular time point.

Further, when the designation of all the images to be processed is over, the operator inputs a message that the designation is over. In the case where the keyboard is used for designating the images to be processed, this input operation can be performed by depressing a predetermined key (at least a key other than the arrow keys described above) such as the space bar on the keyboard. In the case where the mouse 20 is used for designating the images to be processed, on the other hand, the same operation can be performed by, for example, pointing to a predetermined area other than the area of the simulation image 120 on the display unit 18 with the mouse 20.

In the next step 314, therefore, the input is awaited of a message notifying the end of designation of the images to be processed from the operator as described above. After thus waiting for the end of the designation of the images to be processed, the process proceeds to step 316 in which the positions of all the images to be processed (the frame numbers of the images to be processed in the present embodiment) designated by the operator are stored in a predetermined area of the RAM 68. Also, in the case where the image reading process is executed at the time of the printing operation, the number of prints of each image to be processed input from the operator is stored as an item corresponding to each image to be processed.

In the next step 318, the simulation images corresponding to the positions of the film images to be processed stored by designation from the operator in steps 312 to 316 above are displayed in an accentuated manner.

Figure 11A:
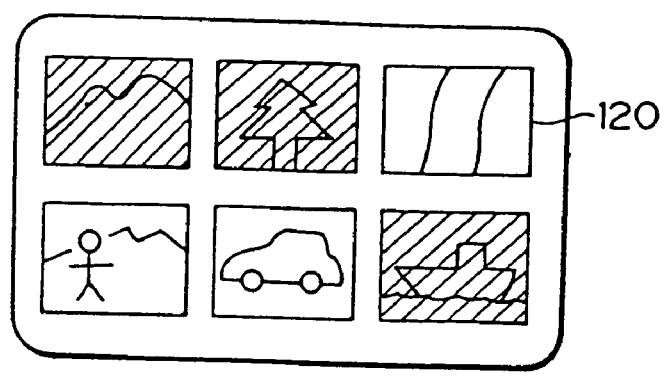
FIGS. 11A, 11B, 11C and 11D are schematic diagrams showing examples accentuated display of simulation images corresponding to film images to be processed designated by the operator.
Figure 11B:
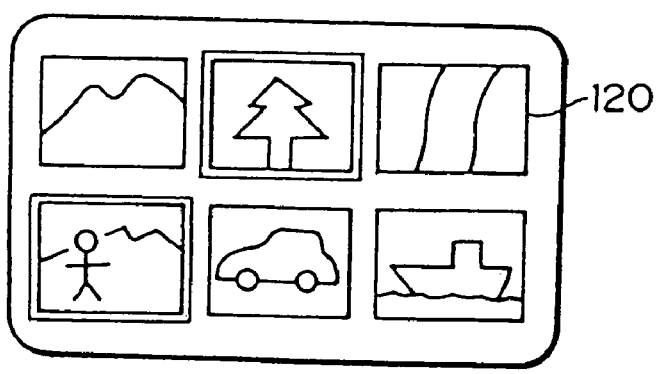
Figure 11C:
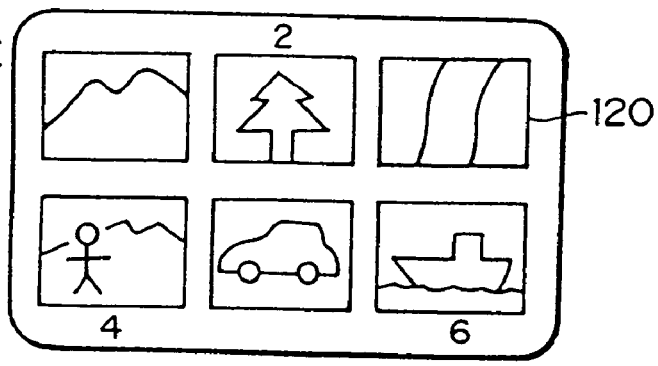
Figure 11D:
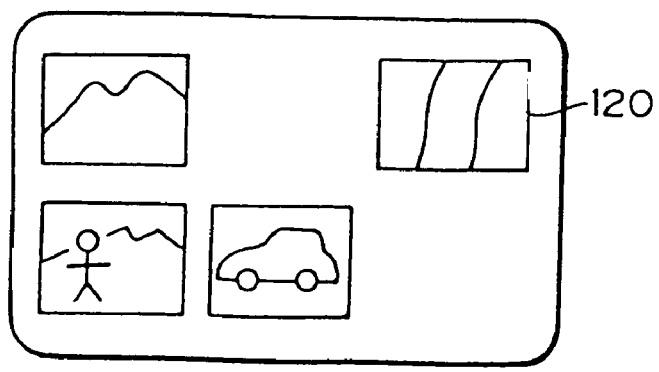

Methods of accentuated display, for example, a method shown in FIG. 11A in which the brightness of the simulation images designated is increased as compared with the brightness of the simulation images not designated (in FIG. 1A, the simulation image not designated is displayed darker (as indicated by hatch)), a method shown in FIG. 11B in which only the simulation images designated are surrounded by a frame, a method shown in FIG. 11C in which the frame numbers on the photographic frames of only the simulation images designated are displayed, and a method shown in FIG. 11D in which only the designated simulation images are displayed. By this accentuated display, it is clear which images are to be processed.

In the next step 320, a message requesting the operator to verify the simulation images is displayed on the display unit 18 or otherwise issued to the operator. Thus, the operator is requested to verify the simulation images.

As a result, in step 318, the operator visually checks the accentuated images among the simulation images on display on the display unit 18, and after making various judgments, perform the operation of verification by inputting the result of judgments. Specifically, first, it is judged whether the frame positions of the film images determined by the image processing section 16 are proper or not. In the case where it is judged that the frame positions are proper, it is judged whether the quality of the simulation images is proper or not (i.e. whether the processing conditions calculated in the image processing section 16 are proper or not). In the case where the image quality (processing conditions) is not proper, the manner in which the processing conditions are to be corrected is determined.

In the case where the judgment is that the frame positions and the image quality of all the accentuated simulation images are proper, information indicating "verification OK" is input as the result of verification by way of the keyboard 12A or the like. In the case where the judgment is that the frame position of a specific simulation image is not proper, on the other hand, information designating the manner in which the processing conditions for the specific film image corresponding to the particular specific simulation image are to be corrected is input by way of the keyboard 12A or the like as the result of verification.

A film image taken using a strobe or a film image taken of a backlit scene, for example, is excessively high in contrast, often with the result that the density of the low density portion of the main object runs short or the tone of the shadowed portion is insufficient on the simulation images. In such a case, the information designating the correction of the degree of enhancement of high-brightness data among the ultralow frequency brightness components of the image is input by the operator as the information designating the correction of the processing conditions so that the tone is compressed only for the area corresponding to the background of the image, i.e. so that the compression degree of the tone is increased for the ultralow frequency brightness component due to the hyper-tone process (the high brightness area in the image of the ultralow frequency brightness component extracted from the image).

In the case where the sharpness is insufficient on the simulation image, for example, the operator inputs the information designating the correction of the degree of enhancing the high frequency components or the like of the image as the information designating the correction of the processing conditions in order to intensify the sharpness. Also, the density of the simulation image for the underexposed or overexposed film image, for example, is generally sided to high density or low density or the contrast of the simulation image is excessively reduced. In such a case, the operator inputs the information designating the correction of the conversion curve of the tone conversion conditions as the information designating the correction of the processing conditions in order to assure the proper density or contrast, as the case may be, in general.

In the next step 322, it is judged whether or not the verification result has been input through the keyboard 12A or the like by the operator, and until the verification result is input, the process waits. When the verification result is input, the process proceeds to step 324 for determining the contents of the information input as the result of verification. In the case where the information designating the correction of the frame position or the correction of the processing conditions for a specific film image corresponding to a specific simulation image is input as the verification result, the process proceeds to step 326, where the contents of correction of the frame position or the processing conditions for the input specific film image are reflected in the frame position or the processing conditions, as the case may be, obtained in the image processing section 16.

Specifically, in the case where the input correction designation is the one for correcting the frame position of a specific film image, the frame position of the specific film image is corrected in accordance with the correction designation, after which as in step 206 described above, the prescan image data is cut out again from the prescan data in accordance with the corrected frame position, a predetermined image feature amount is calculated from the prescan image data thus cut out, and the type and the processing conditions for the image processing of the specific film image are set again by calculation. By correcting the frame position as described above, the image portion on the photographic film 22 can be positively read at the time of fine scan.

In the case where the input correction designation is the one for correcting the processing conditions for a specific film image, on the other hand, the processing conditions are corrected only for the specific film image. In the case where the designation for correcting the processing conditions is the one for correcting the degree of enhancement of a specific frequency component, for example, the degree of enhancement for the particular frequency component is corrected among the image processing conditions. In the case where the designation for correction of the processing conditions is the one designating the correction of the conversion curve of the tone conversion conditions, on the other hand, the conversion curve indicating the tone conversion conditions is wholly or partially corrected in accordance with the correction designation among the image processing conditions. As a result, proper processing conditions can be positively set for each film image.

Upon complete reflection of the contents of the correction of the frame position or the processing conditions as mentioned above, the process proceeds to step 328, where the prescan image data and the processing conditions for the specific film image for which the frame position or the processing conditions have been corrected are retrieved from the image processing section 16, and the process returns to step 302.

As a result, the specific film image for which the frame position or the processing conditions have been corrected are processed in steps 302 and 304 again, so that a simulation image of the specific film image is redisplayed on the display unit 18. The simulation image of the specific film image thus redisplayed is visually checked by the operator. The operator can thus easily judge whether the contents of the designation of the correction previously input are proper or not. In the process, since the designation of the images to be processed is already completed, the judgment in step 310 is affirmative, so that the process proceeds to step 318 skipping step 312 to 316. Thus, the simulation image corresponding to the position of the image to be processed already stored in the RAM 68 is displayed in an accentuated manner.

The processes of steps 302 to 328 are repeated until the operator judges that the frame position and the image quality of all the simulation images displayed in an accentuated manner on the display unit 18 are proper, and inputs the information indicating "verification OK" as a verification result (until the judgment in step 324 becomes negative), so that the frame position and the processing conditions of each film image corresponding to the simulation image displayed in an accentuated manner are corrected in compliance with the designation from the operator. The information indicating "verification OK" is input from the operator through the keyboard 12A or the like, and when the judgment in step 324 becomes negative, the process proceeds to step 330 for judging whether the image verification process has been performed on all the film images recorded in the photographic film 22 to be read. In the case where the judgment is negative, the process returns to step 300 for repeating the steps including and subsequent to step 300. As a result, the images to be processed (the images to be fine scanned according to the present embodiment) among the film images recorded in the photographic film 22 to be read are designated, while at the same time performing the image verification process for the images to be processed. It is thus judged whether the frame position determined and the processing conditions calculated in the image processing section 16 are proper or not, so that the frame position and the processing conditions are corrected as required.

Figure 12B:
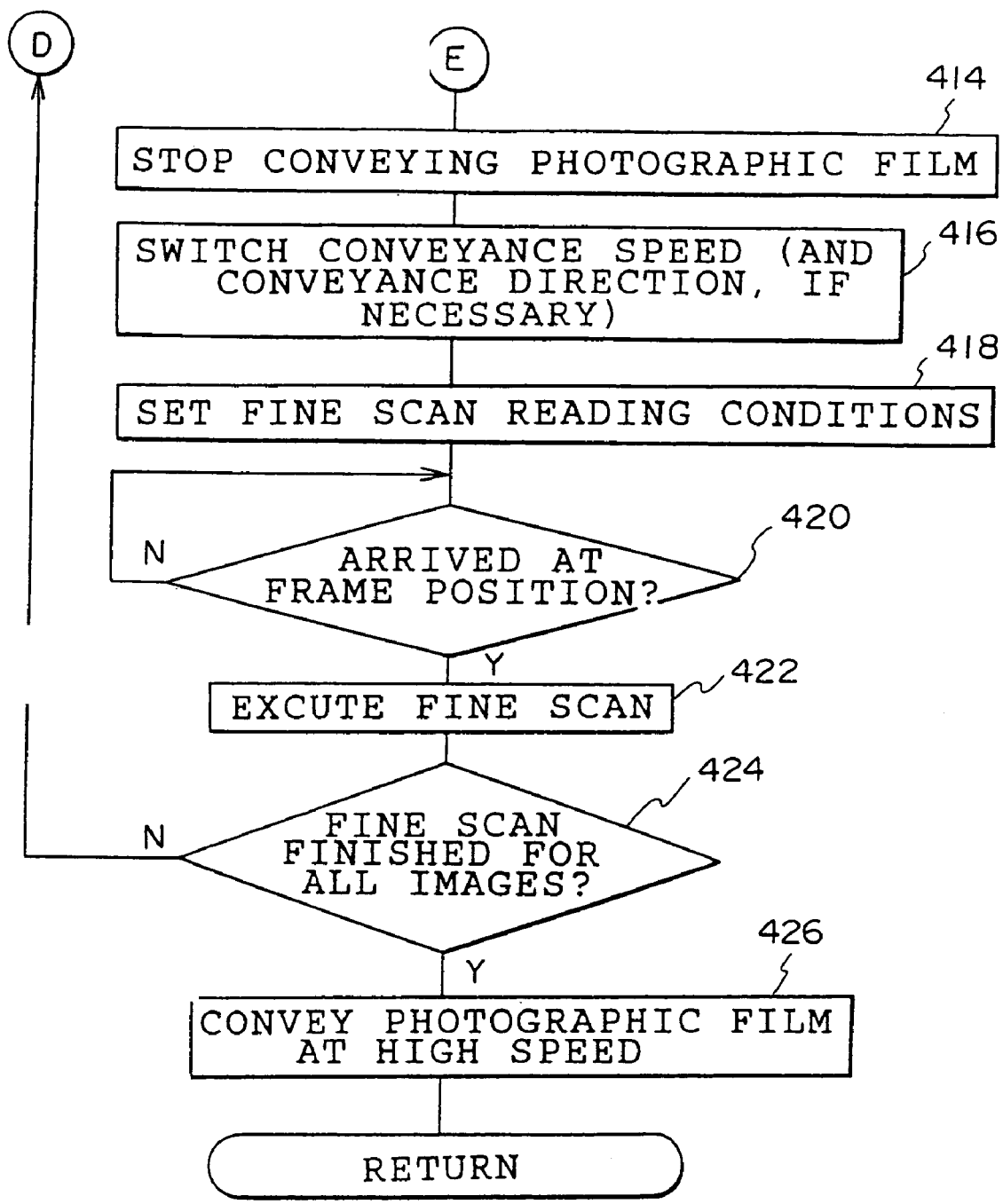

Upon completion of the image verification process described above (when the judgment in step 330 becomes affirmative), in step 210 of FIG. 8, the film carrier 38 is instructed to set the conveying direction of the photographic film 22 in the direction reverse to the predetermined direction (the direction reverse to the arrow C in FIG. 2) in preparation for the fine scan of the film image. Then, in step 212, the fine scan process is carried out. In the fine scan process according to the present embodiment, the photographic film 22 is conveyed by the film carrier 38 at the maximum speed (5×v) thereof during other than the period for reading the film images to be processed, thereby shortening the whole processing time of the fine scan. Now, the fine scan process will be explained with reference to the flowcharts of FIGS. 12A, 12B.

First, in step 400, the type of the film image (in this case, the film image to be processed which first reaches the reading position in the conveying of the photographic film 22 in the direction reverse to a predetermined direction) to be fined scanned is retrieved, the type of the film image is judged, and the reading position on the photographic film 22 located at the time point when the reading conditions corresponding to the particular type can be set (hereinafter referred to as the determinable position) is calculated.

Specifically, in the fine scan process of the image reading apparatus according to the present embodiment, the state of each part of the line CCD scanner is set for each film image in accordance with the type of the film image. Since this setting process requires a long time corresponding to the contents to be set, however, the film image could not be read if the setting of the state of each part is started at the time point when the forward end of the film image next to be read in the direction of conveying has reached the reading position. In step 400, therefore, the position on the photographic film is determined where the state of each part can be completely set, before reading the particular film image, in accordance with the type of the film image next to be read.

Specifically, according to the present embodiment, the speed at which the photographic film 22 is conveyed by the film carrier 38 is set to a predetermined value of the conveying speed (v) for fine scan, and in accordance with the type of the film image to be read, the light amount of the lamp 32 is adjusted by the diaphragm 39, while at the same time adjusting the charge storage time of the line CCD 116 by the electronic shutter included in the line CCD 116. In step 400, the position on the photographic film 22 is calculated, which is gone upstream of the forward end of the film image to be fine scanned, by the distance covered by the photographic film 22 along the conveying direction during the period when the adjustments mentioned above can be completed.

The conveying speed of the photographic film 22 can be switched in accordance with the density of the film image to be read, etc.

In the next step 402, it is judged whether the determinable position on the film image to be fine scanned which has been calculated in step 400 is located downstream of the reading position along the direction in which the photographic film 22 is conveyed. In the case where the position is downstream, the process proceeds to step 404, and after starting the high-speed conveying of the photographic film 22, the process proceeds to step 412. Incidentally, the conveying speed in this case is assumed to be 5×v like the conveying speed for prescan, i.e. the maximum speed of the film carrier 38.

In the case where the judgment in step 402 is that the position is not downstream, on the other hand, the process proceeds to step 406 for judging whether the determinable position is located upstream of the reading position along the direction in which the photographic film is conveyed, and in the case where the position is upstream, the process proceeds to step 408, where the designation for reversal of the conveying direction of the photographic film 22 is issued to the film carrier 38. In the next step 410, the conveying of the photographic film 22 at normal speed (v) started, after which the process proceeds to step 412. In other words, the direction in which the photographic film 22 is conveyed in this case is along the arrow C in FIG. 2 as at the time of prescan.

In step 412, the arrival of the determinable position calculated in step 400 at the reading position is awaited. After that, the process proceeds to step 414 for diaphragming the conveying of the photographic film 22. In the case where the judgment in step 406 is that the determinable position is not located upstream along the direction of conveying, on the other hand, it is assumed that the determinable position is located at the reading position, and the process proceeds to step 414 thereby to diaphragm the conveying of the photographic film 22.

Specifically, in steps 400 to 414, assume that the determinable position of the film image to be fine scanned is located downstream of the reading position along the direction in which the photographic film 22 is conveyed for fine scan, the photographic film 22 is conveyed at the maximum speed of the film carrier 38 until the determinable position reaches the reading position. In the case where the position is upstream, on the other hand, the photographic film 22 is returned so that the determinable position is located at the reading position.

In the next step 416, the speed of conveying of the photographic film 22 by the film carrier 38 is switched to a speed corresponding to the type of the film image to be fine scanned, and then the conveying of the photographic film 22 is started. In the process, in the case where the conveying direction of the photographic film 22 is not the same as the direction of conveying for fine scan, i.e. in the case where the conveying direction of the photographic film 22 is along the arrow C in FIG. 2 as the result of step 408, the conveying is started after the reversal of the conveying direction is designated to the film carrier 38.

In the next step 418, the operation of each part of the line CCD scanner 14 is controlled in such a manner that the film images to be processed are fine scanned under the reading conditions suitable for the type of the film images to be fine scanned. Specifically, the fine scan mode is set in a way corresponding to the type of the film image to be fine scanned. As a result of the process of steps 400 to 414, the photographic film 22 is located at the position where each part can be set as suited to the type of the film image to be fine scanned. The setting according to this step 418, therefore, can be accurately completed before starting the reading of the particular film image.

In the next step 420, based on the frame position stored in a storage unit not shown of the image processing section 16, it is judged whether the edge of the film image to be fine scanned has reached the reading position (the point on the optical axis) of the line CCD 116, and the process waits until the judgment turns affirmative.

Once the judgment in step 420 turns affirmative, the process proceeds to step 422, where the film image that has reached the reading position is read with the line CCD 116. The fine scan process is performed in such a way that the signal output from the line CCD 116 is sequentially A/D converted and sequentially output to the image processing section 16 as fine scan image data. As a result, the film image can be fine scanned under the optimum reading conditions for each type of the film image.

The fine scan image data output from the line CCD scanner 14 to the image processing section 16 is processed in the image processing section 16 under the processing conditions previously stored, and then output for printing in a laser printer unit not shown. Also, in the case where this image reading process is executed at the time of printing, the number of prints designated for each image to be processed which is input by the operator at the time of image verification process is output to the laser printer unit thereby to produce the designated number of prints designated for each image to be processed.

Upon completion of the fine scan for a single film image, the process proceeds to step 424 for judging whether the fine scan has been completed for all the film images to be processed as designated by the operator in the image verification process. In the case where the judgment is negative, the process returns to step 400 for repeating steps 400 to 424. In steps 400 to 424, each film image to be processed is fine scanned under the optimum reading conditions corresponding to the type of each film image designated by the operator in the image verification process described above. In the case where the judgment in step 424 is affirmative, the process proceeds to step 426, where the high-speed conveying (5×v in the present embodiment) of the photographic film 22 is designated to the film carrier 38. After the photographic film 22 is thus delivered at high speed, the fine scan process is terminated and so is the image reading process shown in FIG. 8.

Next, with reference to FIG. 13, an explanation will be given of the image reading process in the case where only one image is to be processed (one film image to be fine scanned) and in the case where adjacent two images are to be processed and each part cannot be normally set in time in a way suitable for reading the second one of the two adjacent images. FIG. 13 is a schematic diagram showing the movement of the reading position relative to the photographic film including steps from "start" to "end" indicated by arrows.

Figure 9A:
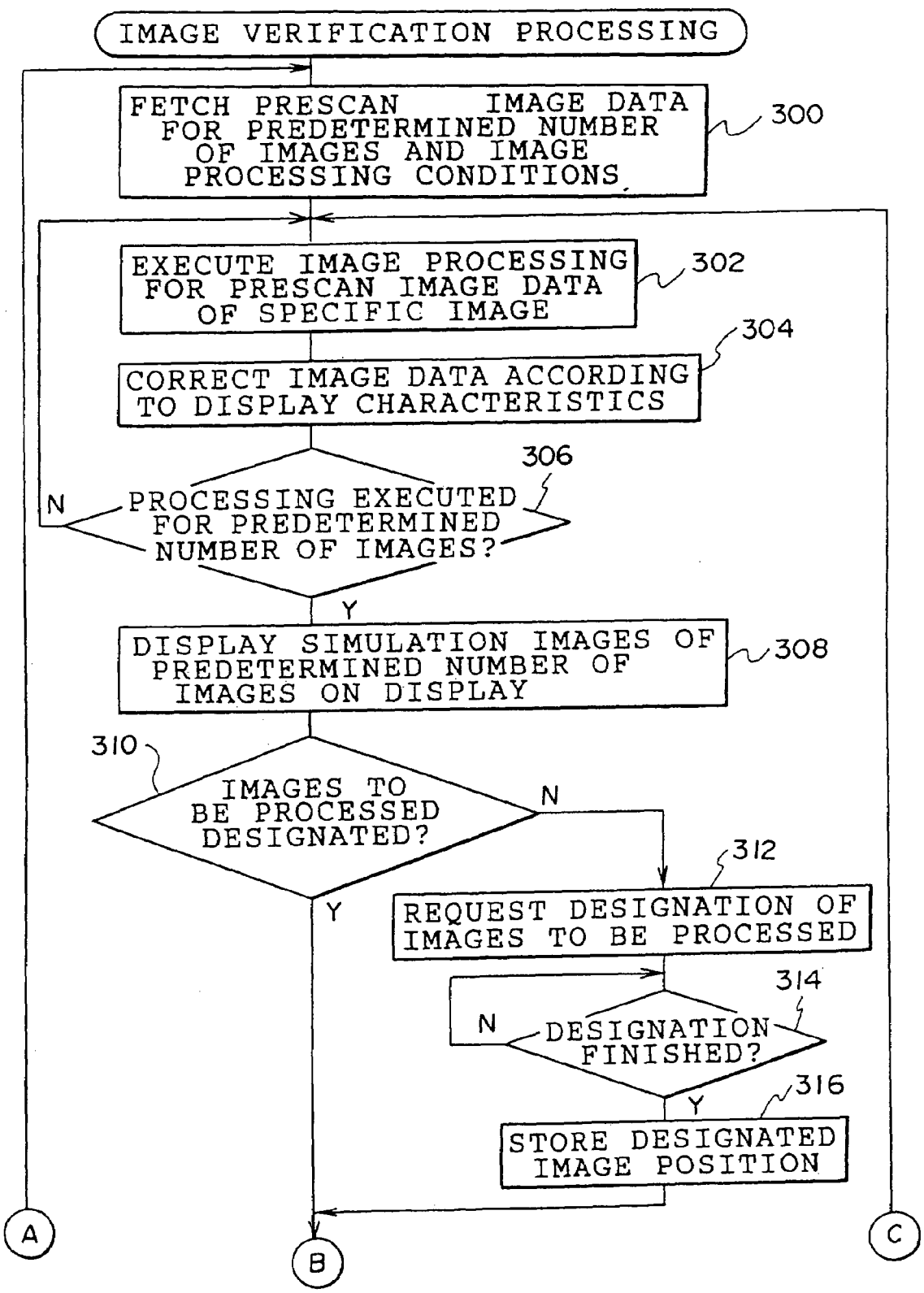

In the case where a single image is to be processed, as shown in FIG. 13A, all the film images 124 of the photographic film 22 conveyed at a predetermined speed (5×v in the present embodiment) for prescan are prescanned, after which the film image to be processed (the film image 124S in FIG. 13A) is designated and the film image 124S designated is verified in the image verification process shown in FIGS. 9A, 9B.

After that, the conveying direction of the photographic film 22 is reversed, and the conveying of the photographic film 22 is started. The photographic film 22 is conveyed at a high speed (5×v in the present embodiment) for the high-speed conveying section 126A from the reading start position 130A for the image to be processed 124S to the position gone upstream by the distance corresponding to the determinable section 128 corresponding to the determinable period where each part can be set in a way suitable for the type of the image to be processed 124S.

After that, the conveying speed of the photographic film 22 is switched to a speed suitable for the type of the image to be processed 124S (expressed as the fine scan speed in FIG. 13A), while at the same time setting each part as suitable for the type of the image to be processed 124S. After that, the image to be processed 124S is read between the read start position 13 and the reading end position 130B. Then, the photographic film 22 is conveyed at high speed (5×v in the present embodiment) in the high-speed conveying section 126B and delivered from the film carrier 38.

In the case where two adjacent images are to be processed and the parts cannot be normally set in time in a way suitable for the second image to be processed, on the other hand, as shown in FIG. 13B, after prescanning all the film images 124 of the photographic film 22 conveyed at speed for prescan (5×v in the present embodiment), the film images to be processed (the film images 124S and 124S' in FIG. 13B) are designated and the film images 124S and 124S' thus designated are verified in the image verification process shown in FIGS. 9A and 9B.

After that, the conveying direction of the photographic film 22 is reversed, and the conveying of the photographic film 22 is started. Thus, the photographic film 22 is conveyed at a high speed (5×v in the present embodiment) in the high-speed conveying section 126A between the reading start position 130A for the image to be processed 124S and a position gone upstream by the distance corresponding to the determinable section 128 corresponding to the determinable period when each part can be set in a way suitable for the type of the image to be processed 124S.

After that, the conveying speed of the photographic film 22 is switched to a speed suitable for the type of the image to be processed 124S (expressed as the fine scan speed in FIG. 13B), while at the same time setting each part in a way suitable for the type of the image to be processed 124S. After that, the image to be processed 124S is read between the reading start position 130A and the reading end position 130B.

Upon complete reading of the image to be processed 124S, the photographic film 22 would normally be conveyed at high speed before reaching the period for reading the next image to be processed 124S'. In the present embodiment, however, as shown in FIG. 13B, partly for the reason that the next image to be processed 124S' is adjacent to the image to be processed 124S, each part cannot be set in a way suitable for the type of the image to be processed 124S' during the section between the reading end position 130B for the image to be processed 124S and the reading start position 130A' for the image to be processed 124S'. Therefore, the photographic film 22 is conveyed in reverse direction to an upstream position by a distance corresponding to the determinable section 128' corresponding to the determinable period for the image to be processed 124S'.

After that, the conveying direction of the photographic film 22 is switched again to the conveying direction for fine scan, and the conveying of the photographic film 22 at fine scan speed is started in a way suitable for the type of the image to be processed 124S'. At the same time, each part is set in a way suitable for the type of the image to be processed 124S'. After that, the image to be processed 124S' is read in the section between the reading start position 130A' and the reading end position 130B'. Then, the photographic film 22 is conveyed at a high speed (5×v in the present embodiment) in the high-speed conveying section 126B and delivered from the film carrier 38.

As described in detail above, in the image reading apparatus according to the first embodiment, at each time of fine scan, the photographic film is conveyed at high speed to the vicinity of the reading start position for the image to be processed (the image to be read) next to be fine scanned and therefore the whole processing time for the image reading process can be shortened.

In the image reading apparatus according to the present first embodiment, in a case in which the film image reading conditions for a film image to be processed after an adjacent film image to be processed cannot be set by the start of reading of the film image to be processed after, the photographic film is returned to a position at which setting of the reading conditions is possible. Thus, reading conditions for each of the film images to be processed can be reliably set.

Also, in the image reading apparatus according to the present first embodiment, the photographic film is delivered at high speed at the point in time when fine scanning of all the images to be processed has been completed, and therefore the whole processing time of the image reading process can be shortened.

In the present first embodiment, the conveying speed in the high speed conveying region is the same as the conveying speed during prescanning. However, the present invention is not limited to the same. The film carrier may be structured such that high speed conveying at speeds higher than the conveying speed (5×v) during image reading at the time of prescan is possible, and the photographic film may be conveyed at such conveying speeds in the high speed conveying region. In this case, the overall processing time of the image reading processing can be shortened even more than in the present first embodiment.

Second Embodiment

In the above-described first embodiment, a case was explained in which, at the time of image verification processing, an operator designates the image to be processed by use of a keyboard or the like. However, in the present second embodiment, the original to be processed is an APS film. Information expressing the film image to be read is stored in advance on the magnetic layer of the APS film, and the image to be processed is designated by reading this information.

Figure 14:
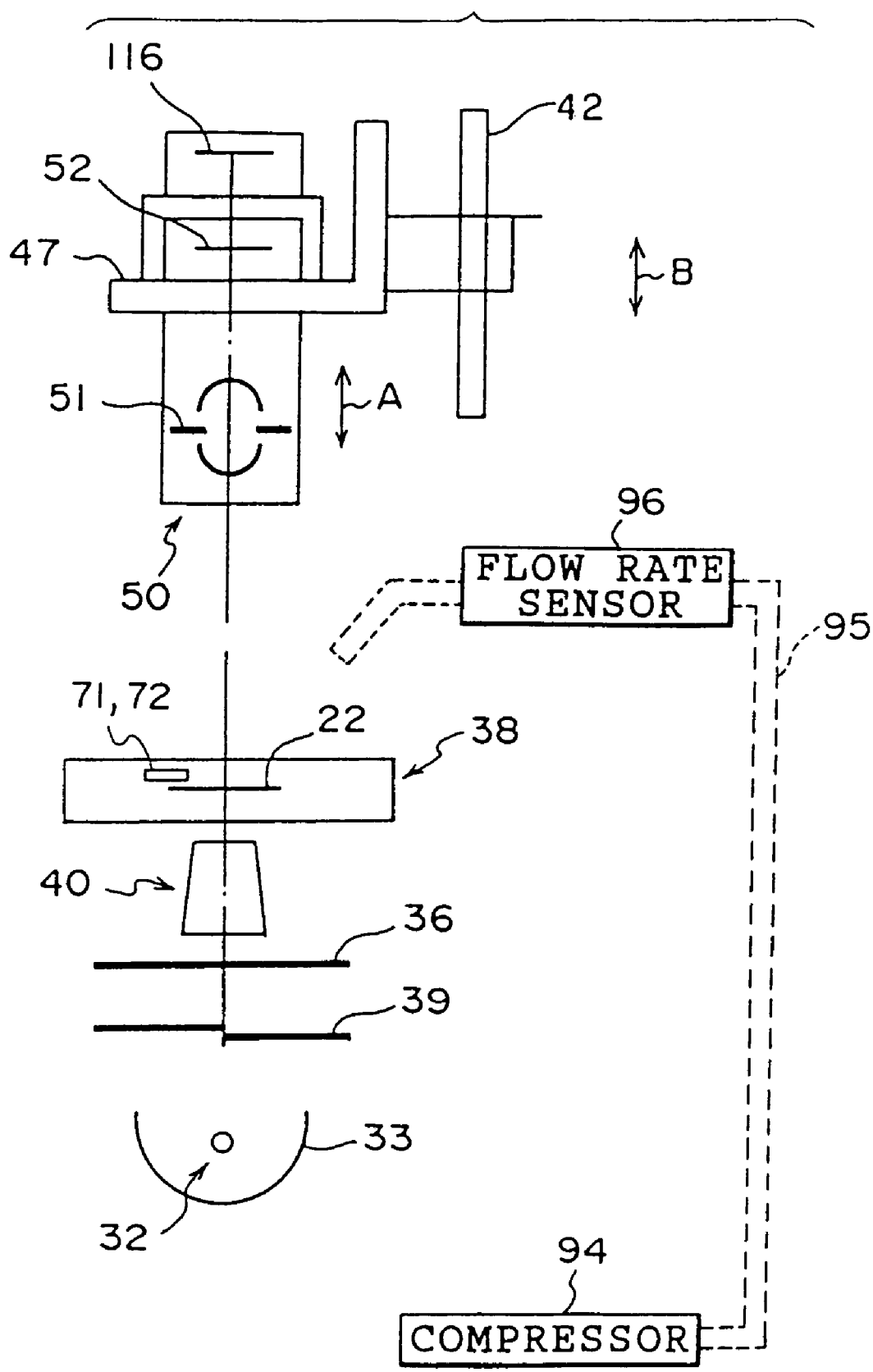
FIG. 14 is a schematic view illustrating only main portions of an optical system of an image reading apparatus relating to a second embodiment of the present invention.
Figure 15:
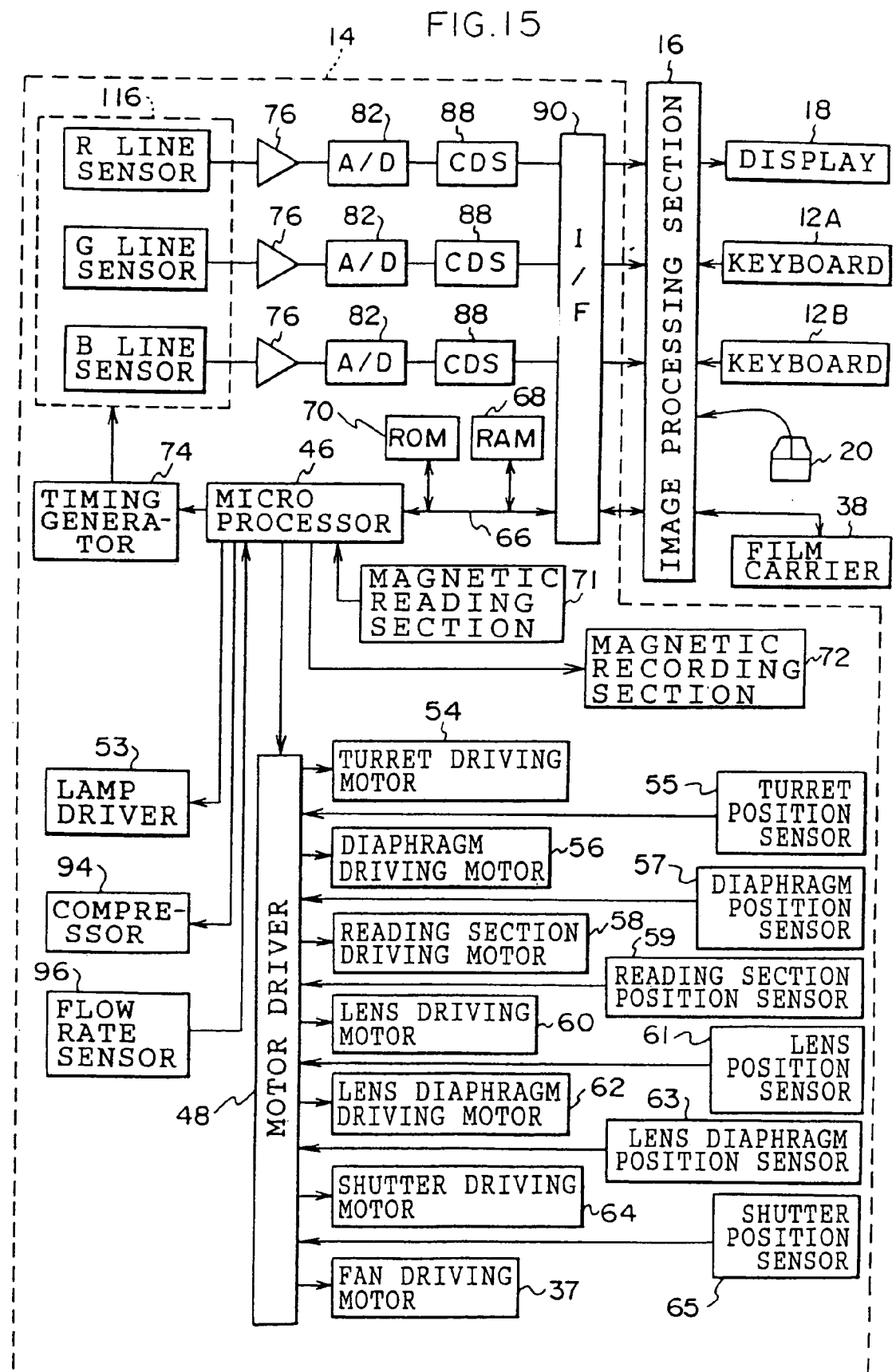
FIG. 15 is a block diagram illustrating a schematic structure of an electrical system of a line CCD scanner and an image processing section of the image reading apparatus relating to the second embodiment.

First, the structure of the image reading apparatus according to the present second embodiment will be described with reference to FIGS. 14 and 15. In FIGS. 14 and 15, parts which are similar to those in FIGS. 6 and 7 are denoted by the same reference numerals, and description thereof is omitted.

As illustrated in FIG. 14, the image reading apparatus of the present second embodiment differs from the image reading apparatus of the previously-described first embodiment only with respect to the point that, in the image reading apparatus of the present second embodiment, a magnetic reading section 71, which reads information recorded on the magnetic layer of the photographic film 22 (an APS film in the present second embodiment), and a magnetic recording section 72, which records various types of information onto the magnetic layer of the photographic film 22, are provided at the film carrier 38. The magnetic reading section 71 is disposed further toward the front along the direction orthogonal to the surface of FIG. 14, and the magnetic recording section 72 is disposed further toward the rear along the direction orthogonal to the surface of FIG. 14.

As illustrated in FIG. 15, the magnetic reading section 71 and the magnetic recording section 72 are connected to the microprocessor 46 of the line CCD scanner 14. Accordingly, in the image reading apparatus of the present second embodiment, the reading of various types of information from the magnetic layer of the photographic film 22 and the recording of various types of information onto the magnetic layer of the photographic film 22 are carried out by the microprocessor 46.

Figure 16:
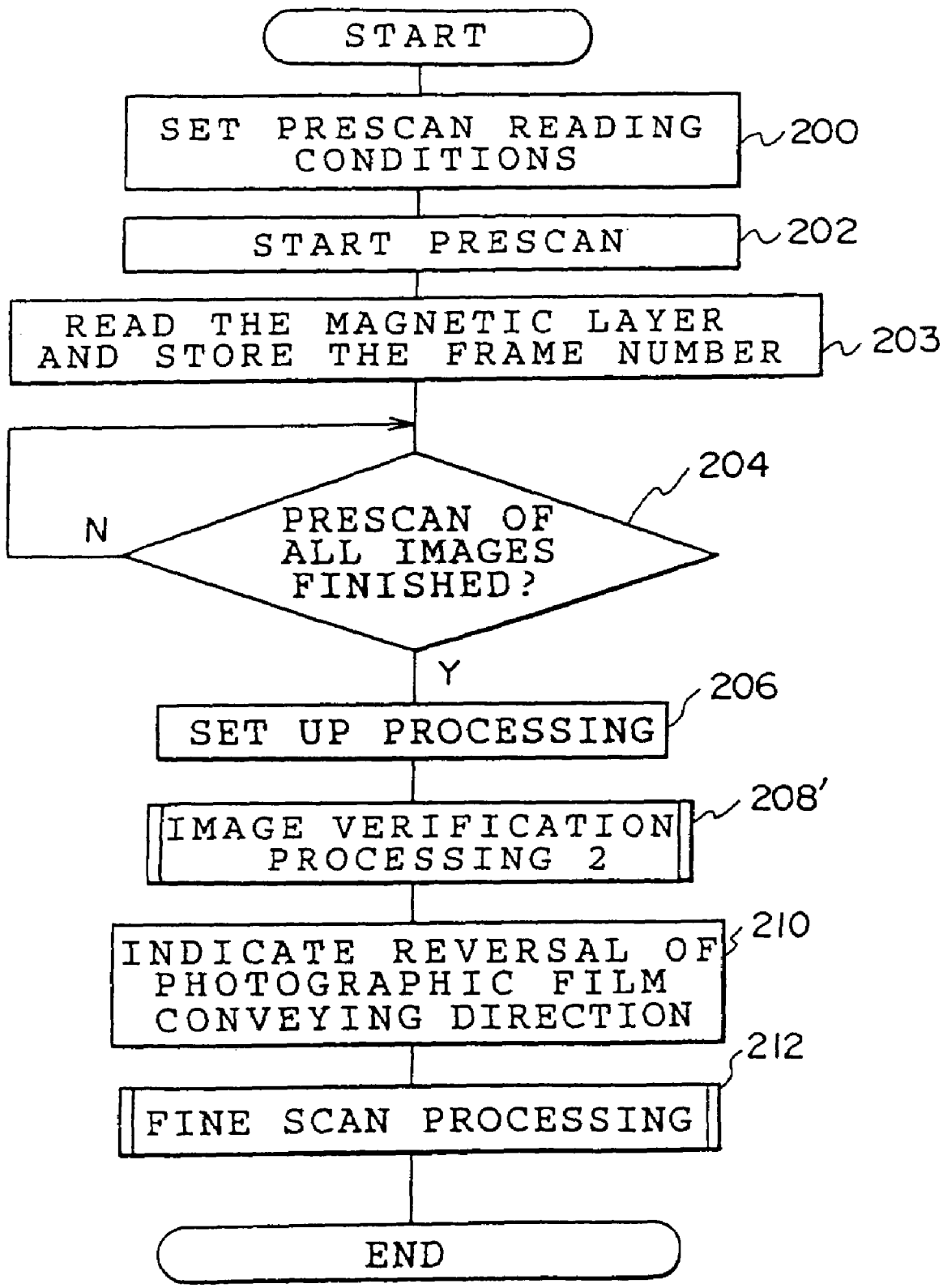
FIG. 16 is a flowchart of image reading processing carried out at a microprocessor of the line CCD scanner in the second embodiment.

Next, processing at the time of image reading of the photographic film 22, which processing is carried out by the microprocessor 46 of the line CCD scanner 14, will be described as the operation of the present second embodiment with reference to FIG. 16. FIG. 16 is a flowchart of image reading processing which is executed at the microprocessor 46 at the time of image reading of the photographic film 22. In FIG. 16, steps in which the same processings as those in FIG. 8 are carried out are denoted by the same step numbers as in FIG. 8, and explanation thereof will be omitted. Before the present processing begins, information representing the film image to be processed is recorded in advance on the magnetic layer of the photographic film 22.

In step 203 of FIG. 16, the magnetic reading section 71 reads the information expressing the film image to be processed from the magnetic layer of the photographic film 22 which is being prescanned, and stores the frame number corresponding to the film image to be processed in a predetermined region of the RAM 68.

Figure 17A:
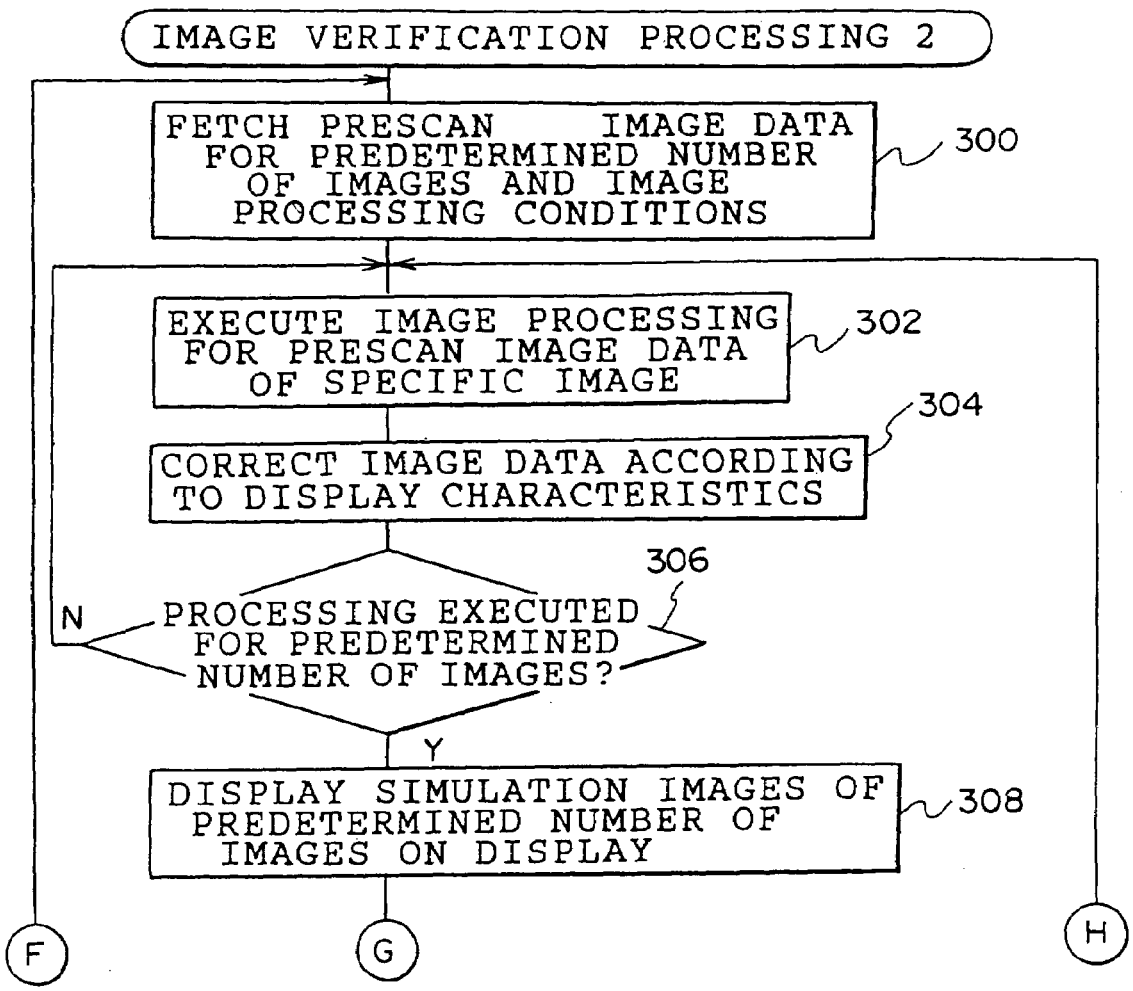
FIG. 17A and FIG. 17B are flowcharts of an image verification processing 2 carried out while the image reading processing of FIG. 16 is being carried out.
Figure 17B:
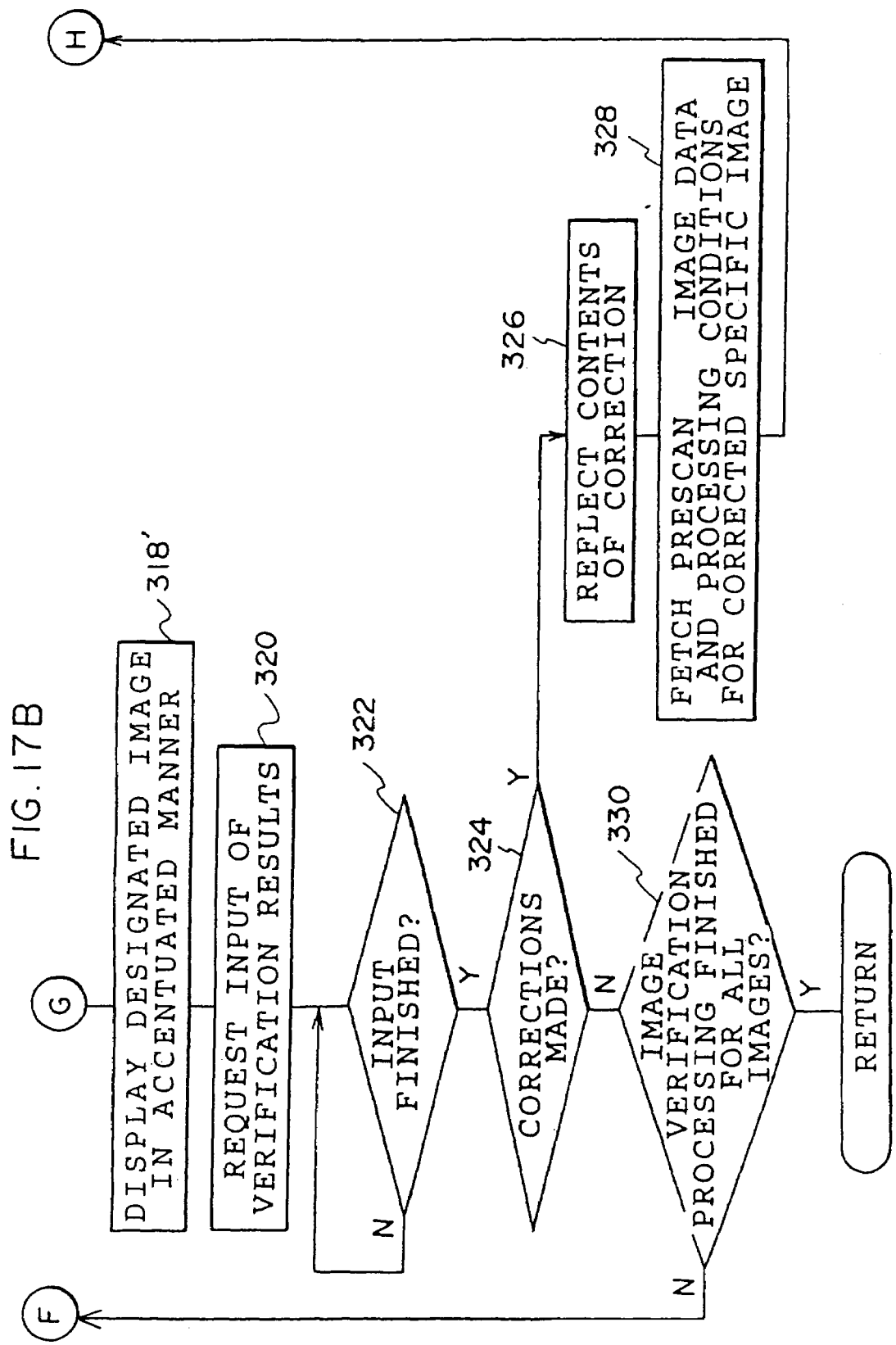

In step 208', the image verification processing 2 shown in FIG. 17 is carried out. In FIG. 17, steps in which the same processings as those in FIG. 9 are carried out are denoted by the same step numbers as in FIG. 9, and explanation thereof will be omitted.

As illustrated in FIG. 17, the image verification processing 2 of the present second embodiment greatly differs from the first embodiment in that the present second embodiment does not include the portions of the image inspection processing of the first embodiment relating to the designation of the image to be processed (steps 310–316). Namely, in the previously described first embodiment, the image to be processed was inputted by the operator through the keyboards 12A, 12B or the mouse 20. However, in the present second embodiment, information representing the film image to be processed is stored in advance on the magnetic layer of the photographic film 22. By reading the magnetic layer at the time of prescanning, the frame number of the film image to be processed can be obtained. Thus, there is no need for an operator to designate the film image to be processed.

Accordingly, in step 318' of FIG. 17, the frame number, which was stored in the predetermined region of the RAM 68 in step 203 of FIG. 16, is read, and film image corresponding to this frame number is recognized as the designated film image, and is displayed in an accentuated state.

When this image verification processing 2 is completed, fine scanning is carried out in the same way as in the first embodiment.

As described above in detail, in the image reading apparatus relating to the present second embodiment, the same effects as those achieved by the image reading apparatus of the first embodiment can be obtained. Further, information expressing the film image to be processed is recorded in advance on the magnetic layer of the photographic film, and by reading this information, the frame number of the film image to be processed can be designated. Therefore, as compared with a case in which the operator makes a designation during the image verification processing, the load on the operator is lightened.

Further, the present second embodiment describes a case in which, when the photographic film 22 is a so-called APS film which is provided with a magnetic layer, information expressing the frame number of the film image to be processed is stored in advance on the magnetic layer, and the film image to be processed is designated by the reading of this information. However, the present invention is not limited to the same. Information expressing the frame number of the film image to be processed may be recorded in advance on the photographic film 22 as a bar code, and the film image to be processed can be designated by the reading of this bar code. Or, the image reading apparatus of the present second embodiment may be provided with a storing means such as a hard disk, or with a reading means for reading a storage medium such as a memory card or a floppy disk. The information representing the film image to be read may be recorded in advance in the storing means or on the storage medium, and designation can be carried out by inputting this information.

Third Embodiment

The first embodiment describes a case in which, in the fine scan processing of FIG. 12, the photographic film 22 is unconditionally conveyed at a high speed when the settable position is positioned at the conveying direction downstream side (i.e., when the determination in step 402 is affirmative). However, in the present third embodiment, high speed conveying is carried out only when the predetermined condition that high speed conveying should be carried out is satisfied. Namely, the present third embodiment is a preferred embodiment of the fourth aspect of the present invention. As the structure of the image reading apparatus of the present third embodiment is the same as that of the first embodiment, description thereof will be omitted.

Figure 18:
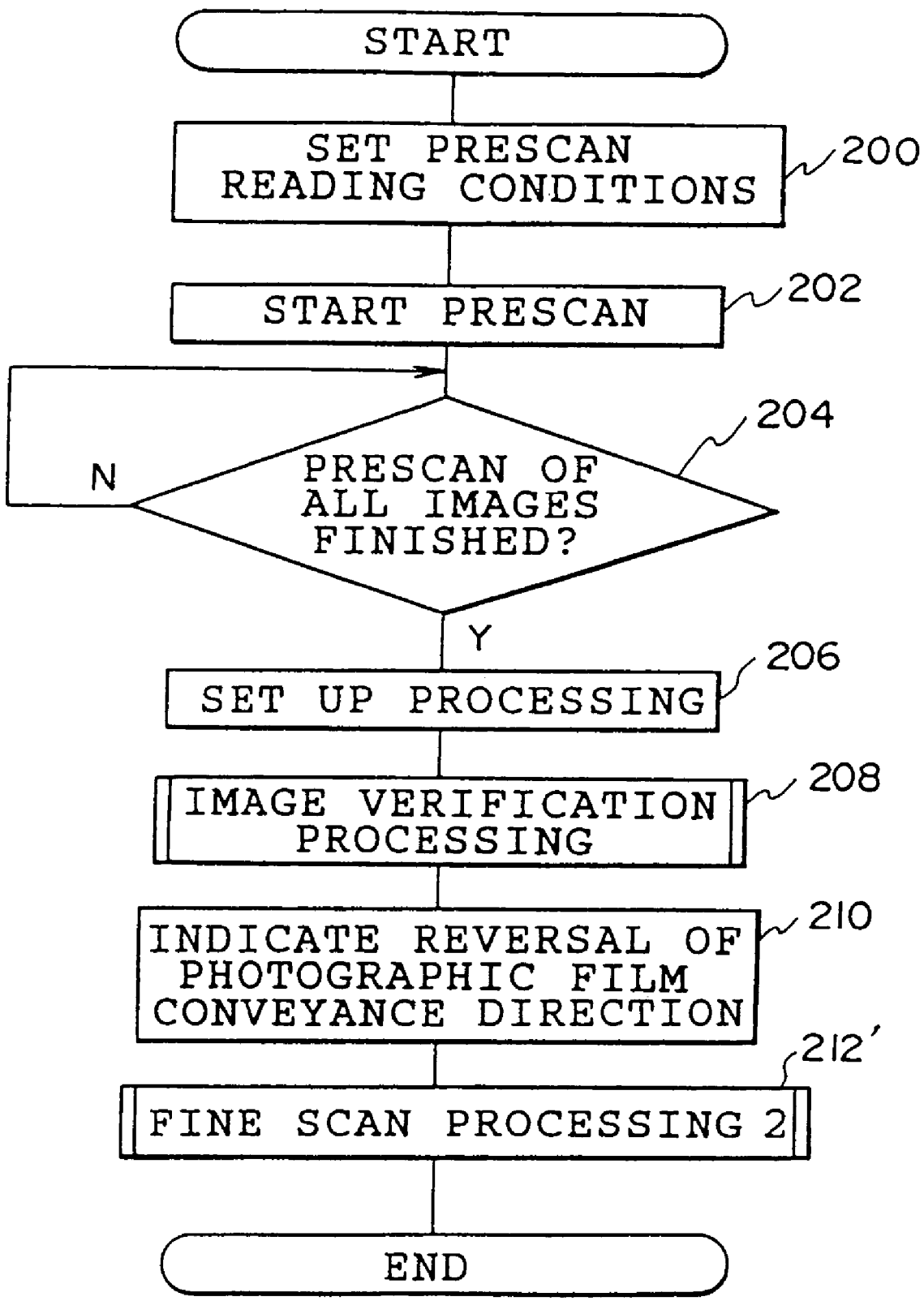
FIG. 18 is a flowchart of image reading processing carried out at a microprocessor of a line CCD scanner in a third embodiment of the present invention.

Processing at the time of image reading of the photographic film 22, which processing is carried out by the microprocessor 46 of the line CCD scanner 14, will be described hereinafter as the operation of the present third embodiment with reference to FIG. 18. FIG. 18 is a flowchart of the image reading processing carried out at the microprocessor 46 at the time of image reading of the photographic film 22. In FIG. 18, steps in which the same processings as those in FIG. 8 are carried out are denoted by the same step numbers as in FIG. 8, and explanation thereof will be omitted.

In FIG. 18, the processing at the time of image reading relating to the present third embodiment differs from the first embodiment only with respect to the point that, in the present third embodiment, the fine scan processing of step 212 of the first embodiment is fine scan processing 2 (step 212') in which control of high speed conveying is carried out in accordance with a predetermined condition.

Figure 19A:
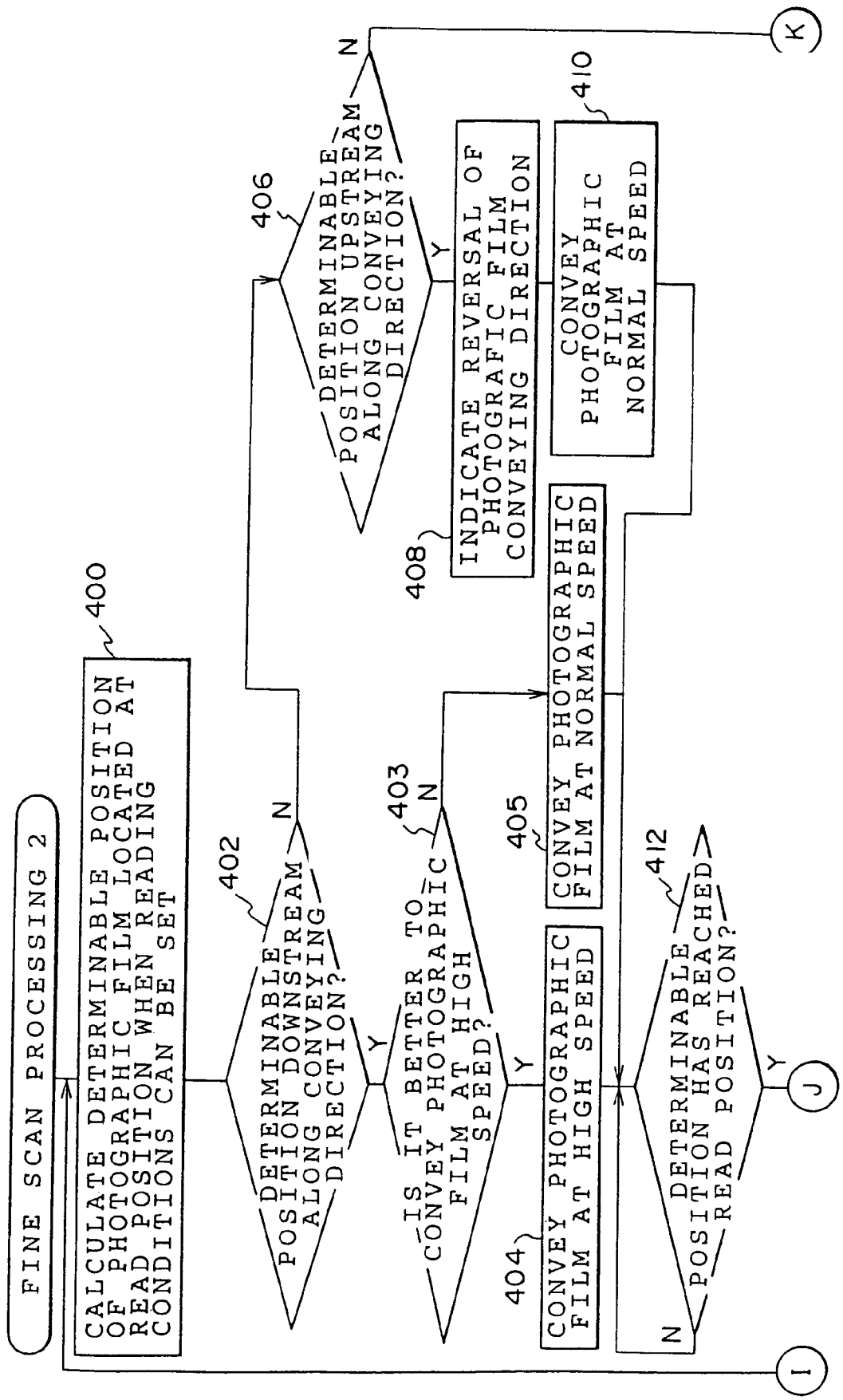
FIG. 19A and FIG. 19B are flowcharts of a fine scanning processing 2 carried out while the image reading processing of FIG. 18 is being carried out.
Figure 19B:
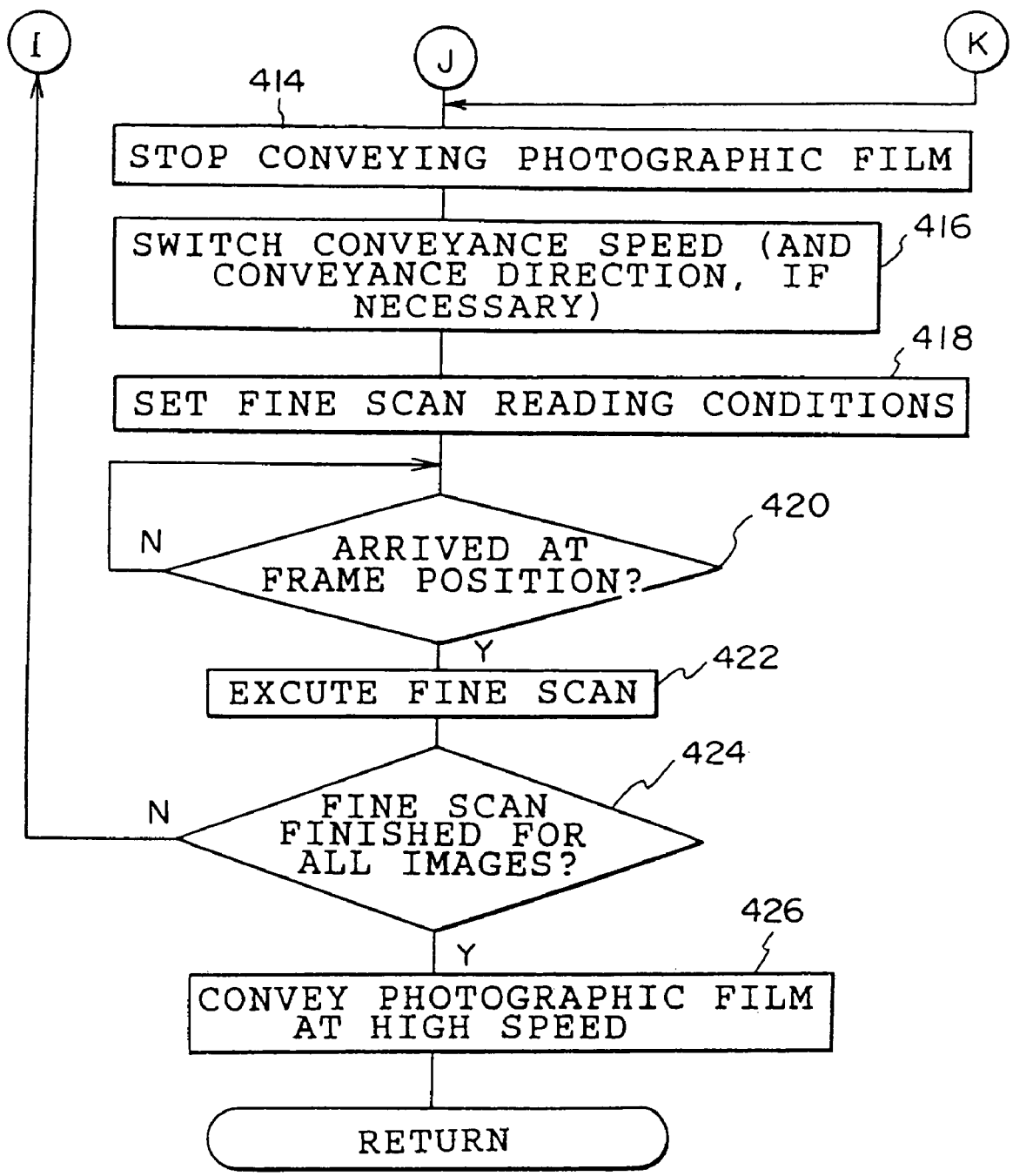

Next, fine scan processing 2 will be described with reference to FIG. 19. In FIG. 19, steps in which the same processings as those in FIG. 12 are carried out are denoted by the same step numbers as in FIG. 12, and explanation thereof will be omitted.

In step 403 in FIG. 19, on the basis of a predetermined condition, a determination is made as to whether the photographic film 22 should be conveyed at high speed until the settable position reaches the reading position. If it is judged that high speed conveying should be carried out (i.e., if the answer to the determination is affirmative), the routine proceeds to step 404 where high speed conveying of the photographic film 22 is started, and thereafter, the routine proceeds to step 412. However, if it is determined that the photographic film 22 should not be conveyed at high speed (i.e., if the answer to the determination in step 403 is negative), the routine proceeds to step 405 where conveying of the photographic film 22 at the regular speed (v) is started, and thereafter, the routine moves on to step 412.

In the present third embodiment, the predetermined condition is whether the distance from the present reading position to the reading start position of the next film image to be read is at least the length of two film images. Only in cases in which this distance is at least the length of two film images is the photographic film 22 conveyed at high speed. Namely, in order to read with high accuracy the film image to be read, the photographic film 22 must be conveyed stably at a predetermined conveying speed corresponding to the density of the film image and the like. However, a predetermined amount of time is needed in order to decelerate, temporarily diaphragm, or accelerate the photographic film 22 so as to move the photographic film 22 to the predetermined conveying speed after the conveying at high speed. In the image reading apparatus relating to the present third embodiment, if the distance up to the reading start position of the next film image to be read is not at least the length of two film images, the overall processing time cannot be shortened. Thus, in the present third embodiment, the predetermined condition is that the distance until the reading start position of the next film image to be read must be greater than or equal to the length of two film images.

Figure 20:
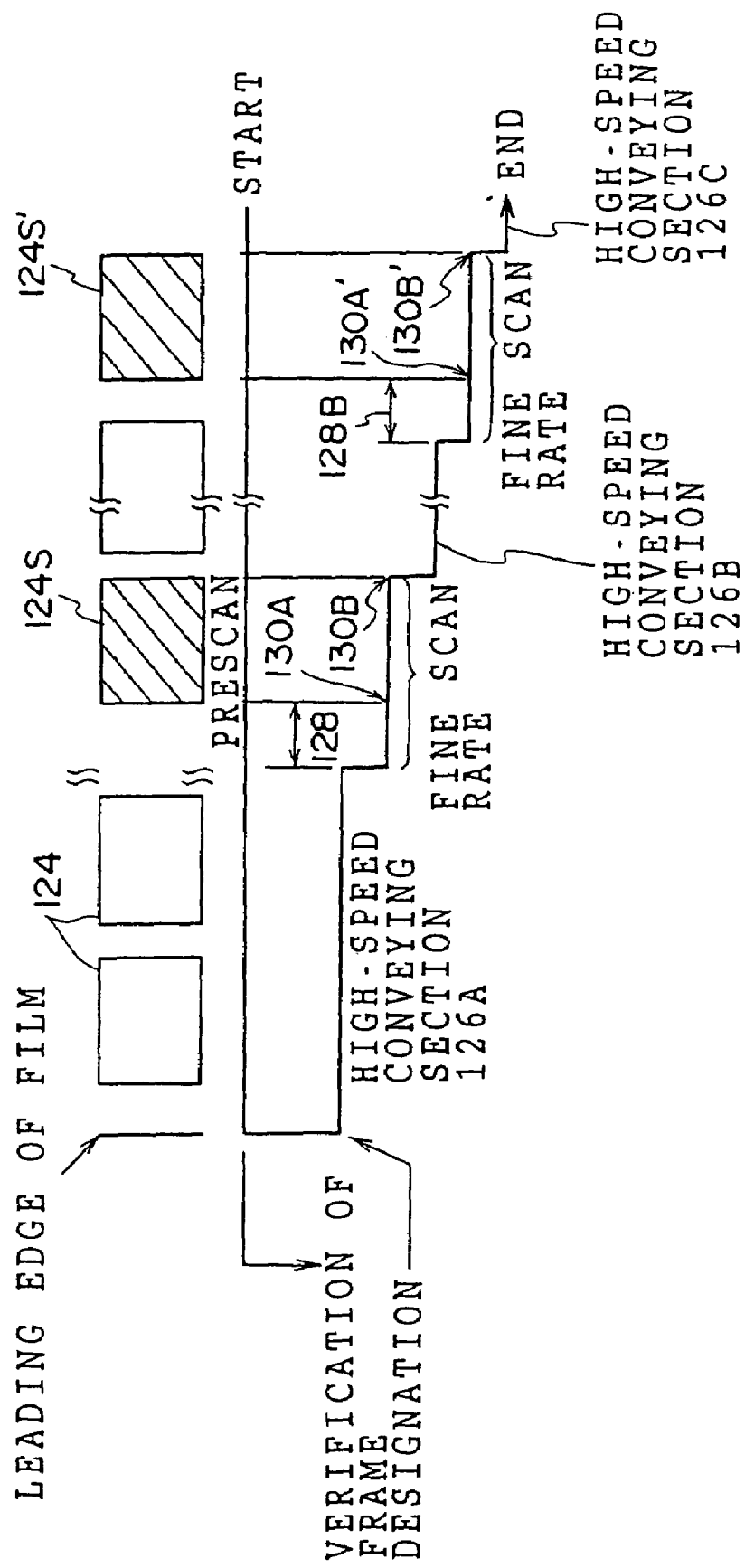
FIG. 20 is a schematic view illustrating a relative positional relationship of a line CCD scanner with respect to a photographic film at the time of image reading processing in the third embodiment, wherein there are two images to be processed and these images to be processed are separated from each other by at least the length of two film images.

Namely, as illustrated in FIG. 20, if, for example, the image to be processed (film image to be fine scanned) is two images, film image 124S and film image 124S', which are separated from each other by at least the length of two film images, prescanning of all of the film images 124 of the photographic film 22 is carried out with the photographic film 22 being conveyed at the prescanning speed (5×v in the present third embodiment). Thereafter, the film images 124S and 124S', which are the images to be processed by the image verification processing shown in FIG. 9, are designated, and the verification of the designated film images 124S and 124S' is carried out.

Thereafter, the conveying direction of the photographic film 22 is reversed, and conveying of the photographic film 22 is started. The photographic film 22 is conveyed at a high speed (5×v in the present embodiment) in a high speed conveying region 126A which extends from a reading start position 130A of the film image 124S to a position which is upstream therefrom by a distance corresponding to a settable region 128 corresponding to a settable time period in which it is possible to set the respective sections in accordance with the type of the film image 124S.

Thereafter, the conveying speed of the photographic film 22 is switched to a speed (the "fine scan speed" in FIG. 20) which is appropriate for the type of the film image 124S, and the respective sections are set appropriately in accordance with the type of the film image 124S. Thereafter, the film image 124S is read between the image reading start position 130A and the image reading end position 130B.

When reading of the film image 124S is completed, because the next film image 124S' is separated by two film image lengths or more from the film image 124S, it is determined that high speed conveying should be carried out. The photographic film 22 is conveyed at high speed in the high speed conveying region 126B which extends from a reading start position 130A' of the film image 124S' to a position which is upstream therefrom by a distance corresponding to a settable region 128B corresponding to a settable time period in which the setting of the respective sections in accordance with the type of the film image 124S' is possible.

Thereafter, the conveying speed of the photographic film 22 is switched to a speed (fine scanning speed) which is appropriate for the type of the film image 124S'. After the respective sections have been set appropriately in accordance with the type of the film image 124S', reading of the film image 124S' is carried out from the reading start position 130A' to the reading end position 130B'. Thereafter, the photographic film 22 is conveyed at high speed in the high speed conveying region 126C, and is discharged from the film carrier 38.

As described in detail above, in the image reading apparatus of the present third embodiment, on the basis of a predetermined condition, a determination is made as to whether the photographic film should be conveyed at high speed. The photographic film is conveyed at high speed only in cases in which the film should be conveyed at high speed. Therefore, the overall processing time can reliably be shortened.

In the present third embodiment, a case is described in which the predetermined condition expressing that the photographic film should be conveyed at high speed is that the distance from the current reading position to the reading start position of the next film image to be read is at least the length of two film images. However, the present invention is not limited to the same. The following are other examples of the predetermined condition: plural frame images or the same one frame image are repeatedly read plural times under different reading conditions from the same reading start position; in a case in which the original to be read is a photographic photosensitive material having a magnetic layer (i.e., a so-called APS film), the reading start position of the next film image to be read is a position at which can be ensured a stable conveying speed necessary for recording various types of information onto the magnetic layer or reading various types of information from the magnetic layer; and the like.

Fourth Embodiment

In each of the above-described first through third embodiments, high speed conveying is carried out only at the time of fine scanning. However, in the present fourth embodiment, high speed conveying is carried out at the time of prescanning as well.

First, with reference to FIG. 21, the structure of an image reading apparatus according to the present fourth embodiment will be described. Portions of FIG. 21 which are the same as those of FIG. 6 are denoted by the same reference numerals, and description thereof is omitted.

Figure 21:
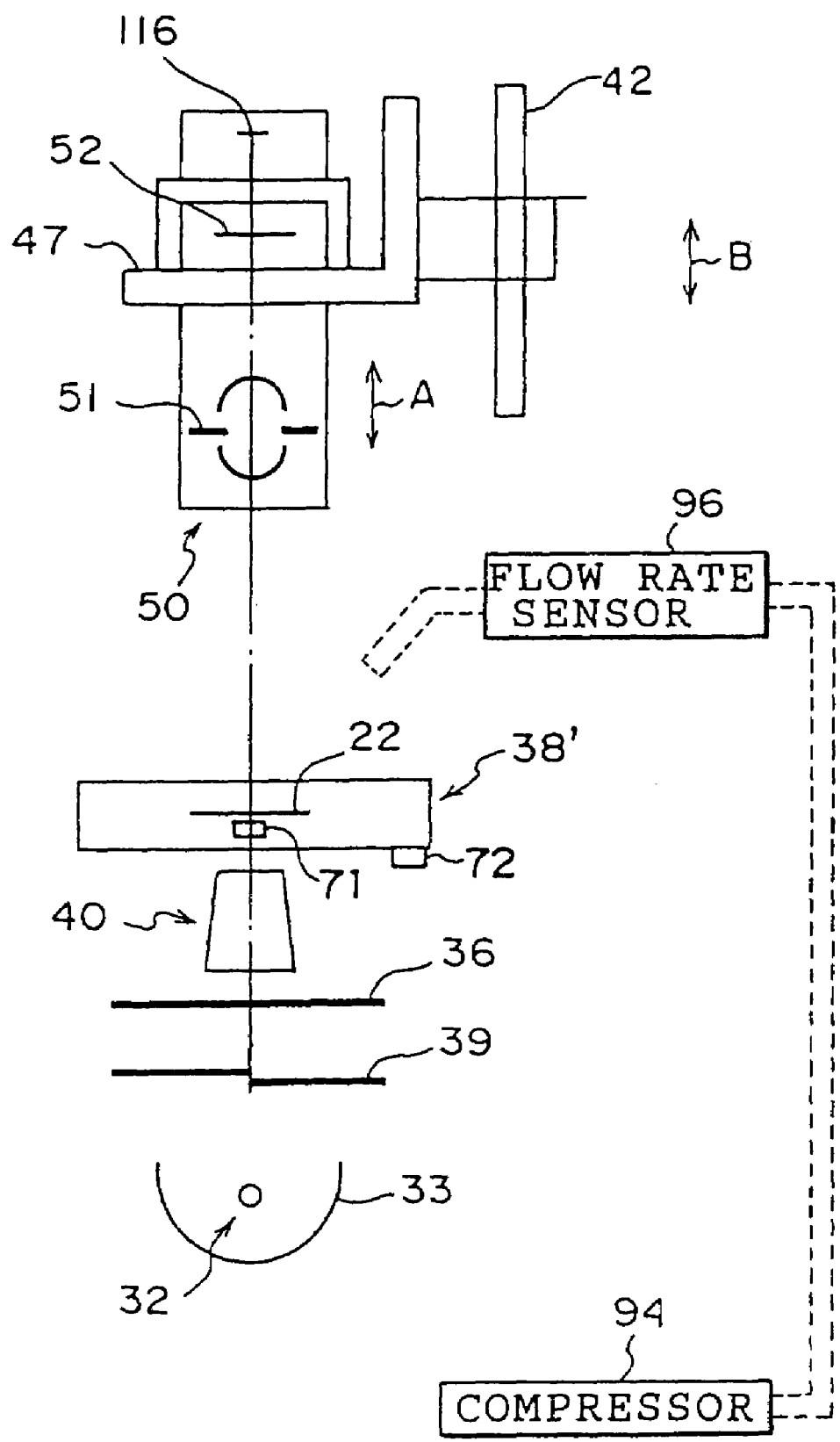
FIG. 21 is a schematic view illustrating only main portions of an optical system of an image reading apparatus relating to a fourth embodiment.

As illustrated in FIG. 21, the image reading apparatus of the present fourth embodiment differs from that of the first embodiment only with respect to the point that, in the present fourth embodiment, the film carrier is film carrier 38' whose fastest conveying speed of the photographic film 22 is 7×v (i.e., a conveying speed which is 7 times the conveying speed v used for ordinary fine scanning of film images). Namely, the value of the fastest conveying speed of the film carrier 38' of the image reading apparatus of the present fourth embodiment is faster than the value of the fastest conveying speed (5×v) of the film carrier 38 of the image reading apparatus relating to the first embodiment.

Figure 22:
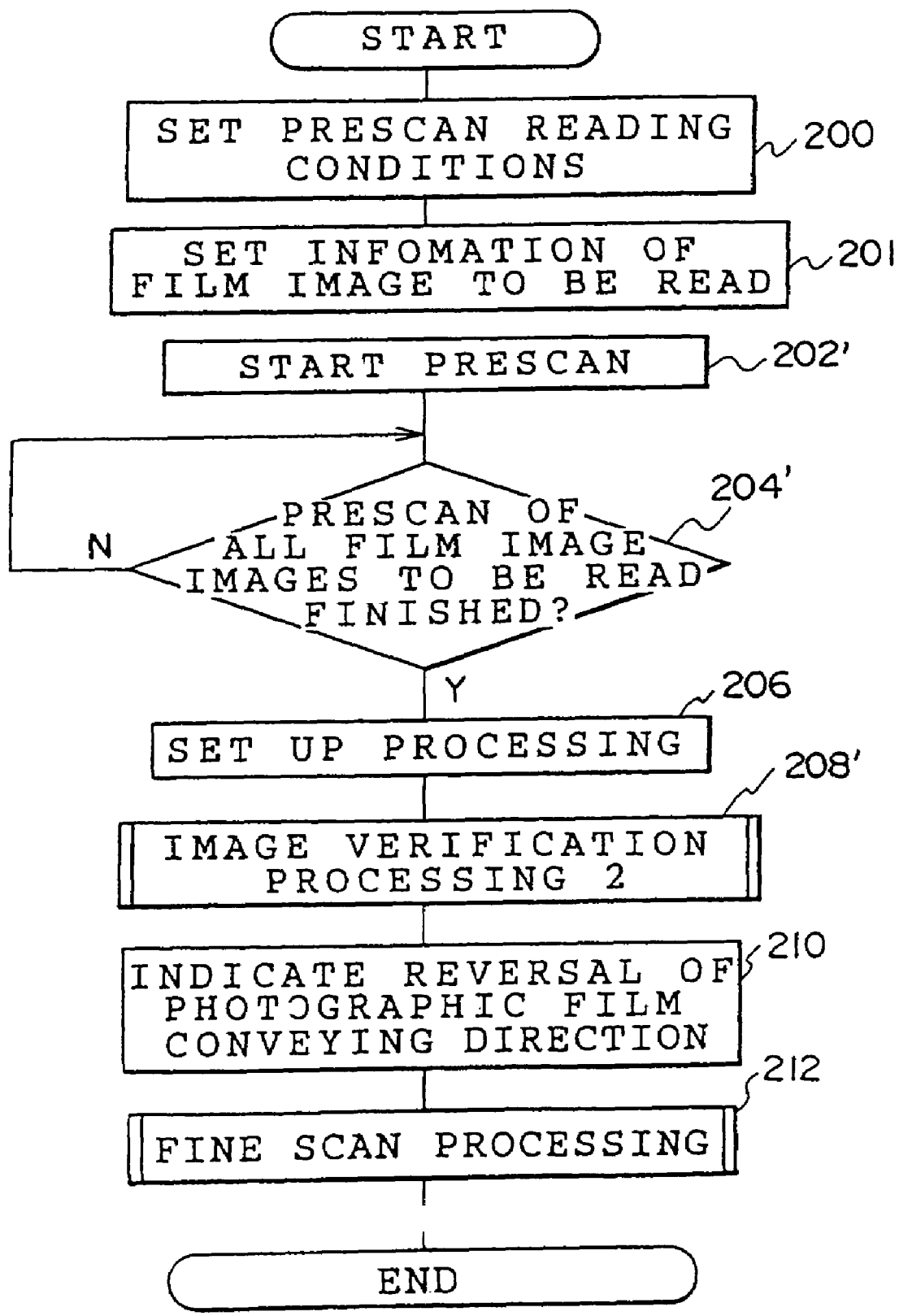
FIG. 22 is a flowchart illustrating image reading processing executed by a microprocessor of a line CCD scanner in the fourth embodiment.

Next, as operation of the present fourth embodiment, processing at the time of image reading of the photographic film 22, which processing is executed by the microprocessor 46 of the line CCD scanner 14, will be described with reference to FIG. 22. FIG. 22 is a flowchart of image reading processing executed by the microprocessor 46 at the time of image reading of the photographic film 22. In FIG. 22, steps in which the same processings as those in FIG. 8 are carried out are denoted by the same step numbers as in FIG. 8, and explanation thereof will be omitted.

As illustrated in FIG. 22, the processing at the time of image reading relating to the present fourth embodiment differs from the first embodiment with respect to the following points. In the present fourth embodiment, a step 201 is added in which setting is carried out of information about the film image which is the next image to be read after the processing in step 200 of the first embodiment is carried out. The prescan starting processing in step 202 is, in the fourth embodiment, processing (step 202') starting the prescanning of only the film image which is to be read. The determination processing as to the end of the prescanning in step 204 is, in the fourth embodiment, a determination processing (step 204') whose object is only the film image which is to be read. Further, the image verification processing of step 208 is, in the fourth embodiment, the image verification processing 2 (step 208') described in the second embodiment.

Namely, in step 201 of FIG. 22, information on the film image which is to be read (in the present embodiment, information showing the position of the film image to be read) is set. In the same way as in the previously described second embodiment, in this setting, when the photographic film 22 is an APS film which is provided with a magnetic layer, information expressing the position of the film image to be read may be recorded in advance on the magnetic layer, and setting may be carried out by the reading of this information. Or, the information expressing the position of the film image to be read may be recorded in advance on the photographic film 22 as a bar code, and the film image to be read may be set by reading this bar code. Or, the image reading apparatus of the present fourth embodiment may be provided with a storing means such as a hard disk, or with a reading means for reading a storage medium such as a memory card or a floppy disk. The information about the film image to be read may be recorded in advance in the storing means or on the storage medium, and setting can be carried out by inputting this information.

After setting of the information regarding the film image to be read has been completed, in the next step 202', conveying of the photographic film 22 in a predetermined direction (the direction of arrow C in FIG. 2) is designated to the film carrier 38', and prescanning begins (i.e., the photographic film 22, which is conveyed at the conveying speed (5×v) at the time of image reading during prescanning, is read for the shortest reading period (t) by the line CCD 116, and the signals outputted from the line CCD 116 are successively subjected to A/D conversion, and are outputted successively to the image processing section 16 as prescan data). In the present fourth embodiment, on the basis of the information on the film image to be read which information is set in step 201, the photographic film 22 is conveyed at the fastest conveying speed of the film carrier 38' (7×v in the present embodiment) from the reading start position of the film image to be read to a position which is upstream therefrom by a distance corresponding to a period in which it is possible to shift the conveying speed to the conveying speed at the time of image reading during prescanning (i.e., in which it is possible to shift the conveying speed to 5×v in the present fourth embodiment). During the reading of the film image to be read, the photographic film 22 is conveyed at the conveying speed at the time of image reading during prescan.

In subsequent step 204', a determination is made as to whether or not prescanning of the final image to be read in the conveying direction of the photographic film 22 has been completed. The routine stands-by until the answer to this determination becomes affirmative, and when the answer to this determination becomes affirmative, the routine proceeds to step 206.

Thereafter, in step 208', the image verification processing 2 described in the above second embodiment is carried out. Namely, the image verification processing in which there is no designation of film images to be processed is carried out.

As described above in detail, in the image reading apparatus of the present fourth embodiment, the fastest conveying speed of the film carrier is a speed which is faster than the conveying speed at the time of image reading during prescan. Further, before prescanning is carried out, information on the film image to be read is set. Also, not only during fine scanning, but also during prescanning, during periods of time other than those periods relating to image reading, the photographic film is conveyed at a conveying speed which is faster than the conveying speed at the time of image reading during prescan. Thus, the overall processing time of the image reading processing can be shortened even more.

In the image reading apparatus relating to the present fourth embodiment, at the point in time that prescanning of the film image to be read is completed, the conveying direction of the photographic film is reversed, and fine scanning is carried out. Therefore, the overall processing time of the image reading processing can be shortened even more than a case in which fine scanning is carried out after the photographic film is conveyed to the prescanning final end thereof.

Further, in each of the above-described embodiments, an explanation was given of the case in which the present invention is applied to the structure in which each part of the line CCD scanner 14 is set for each image to be processed at the time of fine scan. However, the present invention is not limited to such a case, but is applicable to a structure, for example, in which each part is set in a way suitable for a photographic film to be read only once before fine scan and the fine scan is conducted in the state set in the same way for all the images to be processed. In such a case, the photographic film is conveyed at high speed to the reading start position of the image to be processed, so that the processing time can be shortened even more as compared with the present embodiment.

Although the first through third embodiments described above refer to the case in which the image to be processed is designated by the operator using arrow keys on the keyboard, the invention is not confined to such a case. For example, the frame number on the photographic film 22 corresponding to each simulation image displayed on the display unit 18 is displayed in advance in the vicinity of the particular simulation image, and the frame number of the image to be processed is input using the ten-keys not shown arranged on the keyboard.

The respective embodiments described above refer to the case of using the ways shown in FIGS. 11A to 11D for accentuated display of the image to be processed. The present invention, however, is not limited to such a case. For example, the present invention can employ a structure in which a simulation image corresponding to an image to be processed or a simulation image corresponding to an image not be processed is displayed in blink, or a structure in which a simulation image corresponding to an image not be processed is displayed in reverse video.

Further, the above-described embodiments have been explained with reference to the case in which in order to prevent fading of the color separation filter disposed at the line CCD 116, the light to the line CCD 116 is masked by the CCD shutter 52. The present invention is not limited to such a case but can employ a structure in which the diaphragm 39, for example, is used for masking.

The respective embodiments refer to the case in which the photographic film 22 is a negative film. The present invention, however, is not limited to the same, and can of course be used for reading reversal films (positive films) with equal effect.

Moreover, each of the above-described embodiments has been described with reference to the case in which it is applied to the line CCD 116 as an image sensor according to this invention. This present invention is not limited to such a structure, but an area CCD can be employed or a photoelectric conversion element other than the CCD can also be used.

Figure 23:
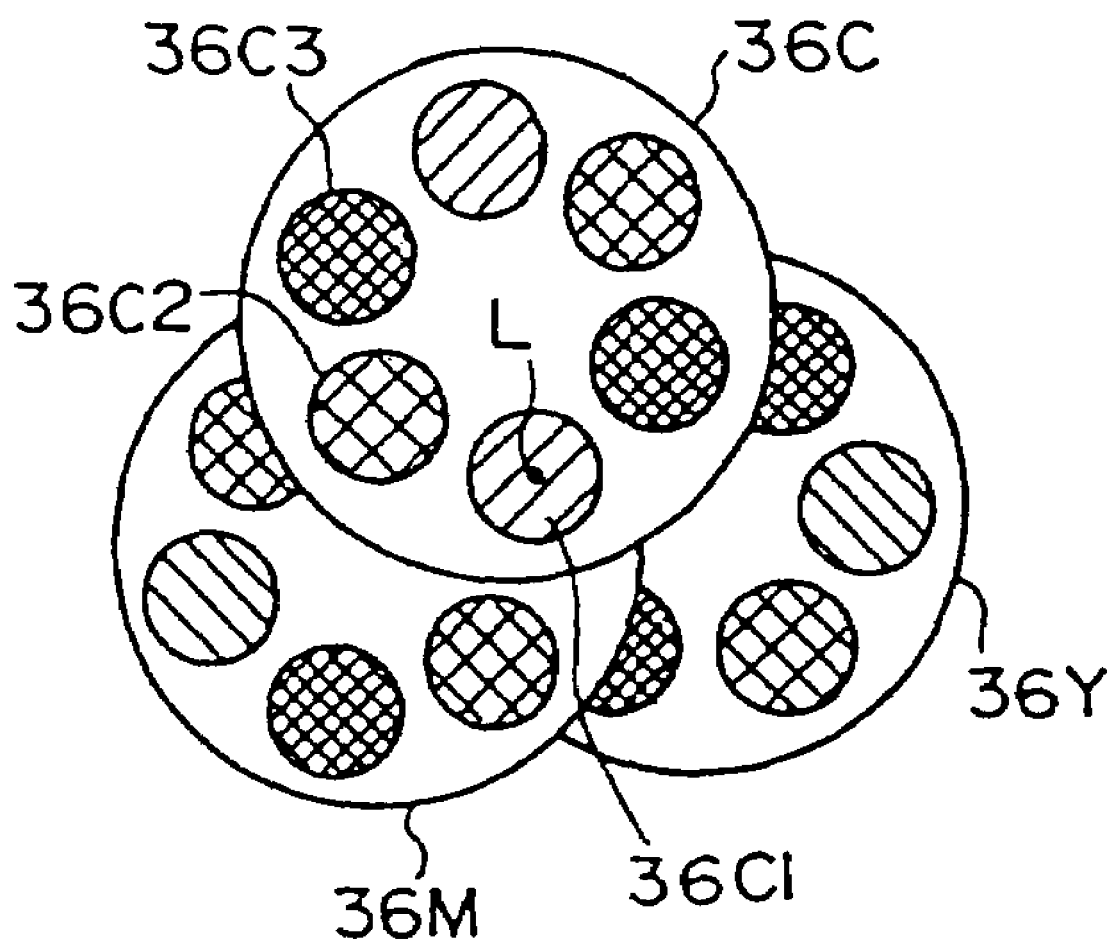
FIG. 23 is a plan view showing a modified example of the turret.

Further, the present invention is not limited to the turret described above (see FIG. 4B), but as shown in FIG. 23, a structure can be employed including a turret 36C for the cyan filter absorbing the red light, a turret 36M for the magenta filter absorbing the green light and a turret 36Y for the yellow filter absorbing the purple-blue light. The turret 36C has fitted therein a plurality of cyan filters 36C1, 36C2, 36C3 of different densities. The cyan filters 36C1, 36C2, 36C3 are higher in density in that order. The other turrets 36M, 36Y also have a similar structure. The turrets 36C, 36M, 36Y are supported rotatably so that selected filters of the turrets are overlapped on the optical axis L.

The image reading apparatus according to the first aspect of the present invention and the image reading method according to the fifth aspect of the present invention have the advantage that the original to be read is conveyed at a speed greater than or equal to a conveying speed corresponding to a reading speed of the image to be read, until a reading start position for the image to be read or a vicinity thereof comes to be located at a predetermined reading position, and therefore, the overall processing time can be shortened.

The image reading apparatus according to the second aspect of the present invention has an advantage similar to that of the first aspect of the present invention and also has the advantage that in the event that the conditions for reading the second one of two adjacent images to be read cannot be set before starting to read the second image to be read, the position of the original to be read is returned to a position where the reading conditions can be set, and therefore the reading conditions can be accurately set for each image to be read.

The image reading apparatus according to the third aspect of the present invention has the advantage that since the reading conditions in the second aspect of the present invention include the speed of the conveying means for conveying the original to be read, and therefore the conveying speed for the original to be read can be set accurately to a value corresponding to the desired reading speed thereby making possible the reading of high accuracy.

In the image reading apparatus according to the fourth aspect of the present invention, on the basis of the reading start position for the image to be read, a determination is made as to whether or not the original to be read should be conveyed at a speed greater than or equal to a conveying speed corresponding to the reading speed of the image to be read, until the reading start position for the image to be read or a vicinity thereof comes to be located at the predetermined reading position. Only in a case in which it is determined that the original to be read should be conveyed at a speed greater than or equal to a conveying speed corresponding to the reading speed, the original to be read is conveyed at a speed greater than or equal to a conveying speed corresponding to the reading speed of the image to be read, until the reading start position for the image to be read or a vicinity thereof comes to be located at the predetermined reading position. Thus, the image reading apparatus of the fourth aspect achieves the excellent effect that the overall processing time can be shortened even more reliably.

What is claimed is:

1. An image reading apparatus comprising:
a light source for illuminating an original to be read by the image reading apparatus with a plurality of images recorded on the image to be read;
conveying means for conveying the original to be read, wherein the plurality of images sequentially come to be located at a predetermined reading position;
an image sensor for separating each image recorded on the original to be read into a plurality of pixels, reading the pixels and outputting image data;
designating means for designating an image to be read among the plurality of images; and
control means for controlling the conveying means; wherein the original to be read is conveyed at a speed greater than or equal to a conveying speed corresponding to a reading speed of the image to be read until a reading start position for the image to be read or a vicinity of the reading start position, which is designated by the designating means, comes to be located at the predetermined reading position, and while the image is being read, the original to be read is conveyed at a conveying speed corresponding to the reading speed for the image to be read.

2. An image reading apparatus according to claim 1, wherein a plurality of images to be read are designated by the designating means, and in a case where the images are successively read, reading conditions for a second one of two adjacent images to be read cannot be set before starting to read the second image to be read, the control means controls the conveying means, wherein the position of the original to be read is returned to a position in which the reading conditions can be set.

3. An image reading apparatus according to claim 2, wherein the reading conditions include the speed at which the conveying means conveys the original to be read.

4. An image reading apparatus according to claim 3, wherein the original to be read is conveyed at high speed after completion of reading of the image to be read.

5. An image reading apparatus according to claim 4, wherein the reading conditions are the same for all of the images to be read.

6. An image reading apparatus according to claim 3, wherein the reading conditions are set for each of the images to be read.

7. An image reading apparatus according to claim 3, wherein the reading conditions are the same for all of the images to be read.

8. An image reading apparatus according to claim 2, wherein the original to be read is conveyed at high speed after completion of reading of the image to be read.

9. An image reading apparatus according to claim 8, wherein the reading conditions are set for each of the images to be read.

10. An image reading apparatus according to claim 4, wherein the reading conditions are set for each of the images to be read.

11. An image reading apparatus according to claim 8, wherein the reading conditions are the same for all of the images to be read.

12. An image reading apparatus according to claim 2, wherein the reading conditions are set for each of the images to be read.

13. An image reading apparatus according to claim 2, wherein the reading conditions are the same for all of the images to be read.

14. An image reading apparatus according to claim 1, wherein the original to be read is conveyed at high speed after completion of reading of the image to be read.

15. An image reading apparatus according to claim 1, wherein on the basis of the reading start position for the image to be read, the control means determines whether or not the original to be read should be conveyed at a speed greater than or equal to a conveying speed corresponding to the reading speed of the image to be read until the reading start position for the image to be read or a vicinity of the reading start position is located at the predetermined reading position, and only in a case in which it is determined that the original to be read should be conveyed at a speed greater than or equal to a conveying speed corresponding to the reading speed, the control means controls the conveying means to convey the original to be read at a speed greater than or equal to a conveying speed corresponding to the reading speed of the image to be read until the reading start position for the image to be read or a vicinity of the reading start position is located at the predetermined reading position.

16. An image reading method comprising the steps of:
illuminating an original to be read using the image reading method, on which a plurality of images are recorded;
conveying the original to be read, wherein the plurality of images are successively positioned at a predetermined reading position;
separating each of the plurality of images into plural pixels;
reading the plural pixels using an image sensor and outputting the read plural pixels as image data,
conveying the original to be read at a speed greater than a conveying speed corresponding to a reading speed of an image to be read, which is designated from among the plurality of images recorded on the original to be read, until a reading start position of the image to be read or a vicinity of the reading start position is located at the predetermined reading position; and
effecting control wherein, at the time of reading the image to be read, the original to be read is conveyed at a conveying speed corresponding to a reading speed of the image to be read.

17. An image reading method according to claim 16, wherein the image to be read comprises plural images to be read, and when the plural images to be read are read in succession, conveying of the original to be read is controlled wherein, in a case when a reading condition of a later image to be read among adjacent images to be read cannot be set by the starting of reading of the later image to be read, a position of the original to be read is returned to a position at which setting of the reading condition of the later image to be read is possible.

18. An image reading method according to claim 17, wherein the reading condition of the later image to be read is a conveying speed of the original to be read.

19. An image reading method according to claim 16, wherein on the basis of the reading start position for the image to be read, a determination is made as to whether or not the original to be read should be conveyed at a speed greater than a conveying speed corresponding to the reading speed of the image to be read until the reading start position for the image to be read or a vicinity of the reading start position is located at the predetermined reading position, and only in a case in which it is determined that the original to be read should be conveyed at a speed greater than a conveying speed corresponding to the reading speed, the conveying of the original to be read is controlled wherein the original to be read is conveyed at a speed greater than a conveying speed corresponding to the reading speed of the image to be read until the reading start position for the image to be read or a vicinity of the reading start position is located at the predetermined reading position.

* * * * *